US008503352B2

(12) United States Patent
Kim et al.

(10) Patent No.: US 8,503,352 B2
(45) Date of Patent: Aug. 6, 2013

(54) METHOD AND APPARATUS FOR TRANSMITTING/RECEIVING REFERENCE SIGNAL FOR POSITIONING IN WIRELESS COMMUNICATION SYSTEM

(75) Inventors: Sang-Heon Kim, Suwon-si (KR); Jae-Weon Cho, Seongnam-si (KR); Hee-Won Kang, Seongnam-si (KR); Jin-Hee Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 12/912,044

(22) Filed: Oct. 26, 2010

(65) Prior Publication Data
US 2011/0103307 A1 May 5, 2011

(30) Foreign Application Priority Data

Nov. 5, 2009 (KR) .................. 10-2009-0106685
Jan. 9, 2010 (KR) .................. 10-2010-0002047
Mar. 12, 2010 (KR) .................. 10-2010-0022509
May 13, 2010 (KR) .................. 10-2010-0045159

(51) Int. Cl.
*H04B 7/204* (2006.01)
*H04J 1/00* (2006.01)
*H04J 3/24* (2006.01)
*H04M 3/42* (2006.01)

(52) U.S. Cl.
USPC ........... 370/319; 370/343; 370/349; 370/474; 455/414.2

(58) Field of Classification Search
USPC ................. 370/203–210, 229–240, 310–350, 370/431–437, 464–485; 375/130–149; 455/403–414.4
See application file for complete search history.

(56) References Cited

U.S. PATENT DOCUMENTS

| 5,675,344 A | 10/1997 | Tong et al. | |
|---|---|---|---|
| 8,180,378 B2 * | 5/2012 | Wang et al. | 455/456.5 |
| 2011/0110338 A1 * | 5/2011 | Khoryaev et al. | 370/335 |
| 2012/0009941 A1 * | 1/2012 | Zhou et al. | 455/456.1 |

(Continued)

FOREIGN PATENT DOCUMENTS

| JP | 2000-332727 A | 11/2000 |
|---|---|---|
| KR | 10-2003-0058552 A | 7/2003 |

OTHER PUBLICATIONS

"Part 16: Air Interface for Broadband Wireless Access Systems", IEEE WirelessMAN, 2010, New York, NY.

(Continued)

*Primary Examiner* — Tri H Phan
(74) *Attorney, Agent, or Firm* — Jefferson IP Law, LLP

(57) ABSTRACT

A method and apparatus for transmitting/receiving a reference signal for positioning in a wireless communication system are provided. In the method, a BS locates a PA preamble in a second frame among frames constituting each of multiple superframes, locates a SA preamble in first symbols of first and third frames among the frames constituting each of the multiple superframes, determines multiple consecutive first superframes belonging to an LBS zone from among the multiple superframes, includes a reference signal for LBS in a first symbol of a first subframe of a last frame among frames constituting each of the first superframes, includes data in a first symbol of a first subframe of a last frame among frames constituting each of second superframes that correspond to the multiple superframes excluding the first superframes when the data is to be transmitted, and communicates with an MS by using the first and second superframes.

28 Claims, 14 Drawing Sheets

U.S. PATENT DOCUMENTS

2012/0040695 A1* 2/2012 Won et al. ............. 455/456.3
2012/0157117 A1* 6/2012 Choi et al. ............. 455/456.1
2012/0190381 A1* 7/2012 Choi et al. ............. 455/456.1

OTHER PUBLICATIONS

Alexey Khoryaev, Mikhail Shilov, Alexander Maltsev, Yang Seok Choi, Etemad Kamran, Roman Maslennikov: "Proposed text on enhanced LBS support (LBS)", IEEE 802.16 Broadband Wireless Access Working Group, Aug. 30, 2009, XP002618467, Retrieved from the Internet: URL:http://www.i eee802.org/16/tgm/contri b/C80216m-09_2086.doc.

Shu Wang, Ki-Dong Lee, Sang G. Kim, Jin Sam Kwak: "Enhance Downlink Positioning in WiMAX/16m", IEEE 802.16 Broadband Wireless Access Working Group, Sep. 5, 2008, XP002618468, Retrieved from the Internet: URL:http://www.i eee802.org/16/tgm/contri b/C80216m-08_1106r3.pdf.

Shu Wang, Jungwon Min, Li-Hsiang Sun, LGE: "Extended Access Parameters Message for Enhanced LBS Support", 3GPP2-Drafts, 2008. XP040479919.

* cited by examiner

METHOD AND APPARATUS FOR TRANSMITTING/RECEIVING REFERENCE SIGNAL FOR POSITIONING IN WIRELESS COMMUNICATION SYSTEM

PRIORITY

This application claims the benefit under 35 U.S.C. §119 (a) of a Korean patent application filed in the Korean Industrial Property Office on Nov. 5, 2009, and assigned Serial No. 10-2009-0106685, of a Korean patent application filed in the Korean Industrial Property Office on Jan. 9, 2010, and assigned Serial No. 10-2010-0002047, of a Korean patent application filed in the Korean Industrial Property Office on Mar. 12, 2010, and assigned Serial No. 10-2010-0022509, and of a Korean patent application filed in the Korean Industrial Property Office on May 13, 2010, and assigned Serial No. 10-2010-0045159, the entire disclosures of each of which are hereby incorporated by reference.

BACKGROUND OF THE INVENTION

1. Field of the Invention

The present invention relates to a wireless communication system. More particularly, the present invention relates to a method and apparatus for transmitting/receiving a reference signal for positioning in a wireless communication system.

2. Description of the Related Art

A Location-Based Service (LBS), which provides an estimation of a Mobile Station (MS) location in a wireless communication system, may be generally divided into network-based technology and handset-based technology. A typical example of handset-based technology is a Global Positioning System (GPS). The GPS technology provides very accurate positioning, but has a problem in that it cannot function properly or its positioning accuracy is lowered in a crowded area or an indoor environment. The network-based technology uses a wireless communication network to provide an estimation of an MS location by measuring locations of Base Stations (BSs) and measuring Time Difference Of Arrival (TDOA) or Angle Of Arrival (AOA). Also, the network-based technology may be subdivided into technology using Downlink (DL) and technology using Uplink (UL).

In general, each BS in a wireless communication system periodically transmits a reference signal with a unique pattern, that is, a preamble signal, a pilot signal, or a beacon signal, and thus the location of an MS can be estimated based on the reference signal.

Preambles of Orthogonal Frequency Division Multiplexing (OFDM) systems, for example, the preamble of an Institute of Electrical and Electronics Engineers (IEEE) 802.16e system and the Secondary Advance (SA) preamble of the IEEE 802.16m system, are also designed as to use different subcarriers according to sectors, thereby maintaining orthogonality between the sectors. However, interference due to preamble signals transmitted from the same sector of other BSs is still present, and interference is also present because orthogonality cannot be maintained due to the effect of multipath fading. On account of this, there is a problem in that an MS cannot receive preamble signals from neighbor BSs adjacent thereto, which increases an error in positioning.

The inability to receive neighbor BS signals due to interference, that is, the so-called "hearability" problem, similarly occurs in Code Division Multiple Access (CDMA) networks. To address this hearability problem, the $3^{rd}$ Generation Partnership Project (3GPP) has proposed Idle Period Downlink (IPDL) technology in which a specific BS suspends all DL channel transmissions so that an MS can receive pilot signals of other BSs. As a similar solution in an OFDM system, a method has been proposed to improve the reception performance of a preamble signal by allocating a specific subframe for wireless positioning purposes and allowing neighbor BSs to transmit a preamble signal without performing data communication in the specific subframe. However, such suspension of data communication deteriorates service quality and causes a significant problem with a Hybrid Automatic Retransmission reQuest (HARQ) operation. In particular, when synchronous HARQ is used for UL data communication, as in the IEEE 802.16m system, an Acknowledge/Not-Acknowledge (ACK/NACK) message transmitted in the DL has direct influence on the overall HARQ timing, and thus the overall DL data communication is deteriorated.

SUMMARY OF THE INVENTION

An aspect of the present invention is to address at least the above-mentioned problems and/or disadvantages and to provide at least the advantages described below. Accordingly, an aspect of the present invention is to provide a method and apparatus for efficiently transmitting/receiving a reference signal for wireless positioning in a wireless communication system.

Further, an aspect of the present invention is to provide a method and apparatus for efficiently transmitting/receiving a reference signal while minimizing the influence on data communication in a wireless communication system.

Further, another aspect of the present invention is to provide a method and apparatus for periodically allocating and transmitting one or two Orthogonal Frequency Division Multiplexing (OFDM) symbols carrying a reference signal for each frame within a Location-Based Service (LBS) zone.

In accordance with an aspect of the present invention, a method of transmitting a reference signal for positioning in a wireless communication system is provided. The method includes locating a Primary Advance (PA) preamble in a second frame among frames constituting each of multiple superframes, locating a Secondary Advance (SA) preamble in first symbols of first and third frames among the frames constituting each of the multiple superframes, determining a plurality of consecutive first superframes belonging to an LBS zone from among the multiple superframes, including a reference signal for LBS in a first symbol of a first subframe of a last frame among frames constituting each of the first superframes, when data is to be transmitted, including the data in a first symbol of a first subframe of a last frame among frames constituting each of second superframes that correspond to the multiple superframes excluding the first superframes, and communicating with a Mobile Station (MS) by using the first and second superframes.

In accordance with another aspect of the present invention, a method of receiving a reference signal for positioning in a wireless communication system is provided. The method includes detecting a PA preamble from a second frame among frames constituting each of multiple superframes, detecting a SA preamble from first symbols of first and third frames among the frames constituting each of the multiple superframes, when an LBS zone is enabled, determining a plurality of consecutive first superframes belonging to the LBS zone from among the multiple superframes, detecting a reference signal for LBS from a first symbol of a first subframe of a last frame among frames constituting each of the first superframes, and when data is to be received, detecting the data from a first symbol of a first subframe of a last frame among frames constituting each of second superframes that correspond to the multiple superframes excluding the first superframes.

In accordance with yet another aspect of the present invention, a Base Station (BS) apparatus for transmitting a reference signal for positioning in a wireless communication system is provided. The apparatus includes a controller for locating a PA preamble in a second frame among frames constituting each of multiple superframes, locating a SA preamble in first symbols of first and third frames among the frames constituting each of the multiple superframes, determining a plurality of consecutive first superframes belonging to an LBS zone from among the multiple superframes, including a reference signal for LBS in a first symbol of a first subframe of a last frame among frames constituting each of the first superframes, and including data in a first symbol of a first subframe of a last frame among frames constituting each of second superframes, which correspond to the multiple superframes excluding the first superframes, when the data is to be transmitted, and a transceiver for communicating with an MS by using the first and second superframes, under a control of the controller.

In accordance with still yet another aspect of the present invention, an MS apparatus for receiving a reference signal for positioning in a wireless communication system is provided. The apparatus includes a transceiver for transmitting/receiving multiple superframes, and a controller for detecting a PA preamble from a second frame among frames constituting each of the multiple superframes, detecting a SA preamble from first symbols of first and third frames among the frames constituting each of the multiple superframes, determining a plurality of consecutive first superframes belonging to an LBS zone from among the multiple superframes when the LBS zone is enabled, detecting a reference signal for LBS from a first symbol of a first subframe of a last frame among frames constituting each of the first superframes, and detecting data from a first symbol of a first subframe of a last frame among frames constituting each of second superframes, which correspond to the multiple superframes excluding the first superframes, when the data is to be received.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, a Location Based Service (LBS) operation in a wireless cellular communication system will be described with reference to the communication standard based on the Institute of Electrical and Electronics Engineers (IEEE) 802.16m standard. However, it will be apparent to those skilled in the art that the LBS operation according to the present invention is not limited to a specific communication protocol or system configuration, and various changes and modifications are possible without departing from the gist of the present invention.

In an exemplary embodiment of the present invention, in order to improve the reception performance of a neighbor Base Station (BS) signal in a Downlink (DL)-based LBS, a specific zone is assigned for an LBS zone, one or two Orthogonal Frequency Division Multiplexing (OFDM) symbols at a specific position are defined as an LBS symbol for each frame within the LBS zone, and neighbor BSs transmits a reference signal for LBS (that is to say, LBS signal) in a specific order by using the LBS symbol, so that a Mobile Station (MS) can receive LBS signals of several BSs. If such LBS symbols for use in wireless positioning are dispersedly allocated to respective frames in units of symbols within a superframe, data transmission can be maintained through symbols other than the LBS symbols within a subframe in which the LBS symbols exist.

Figure 1:
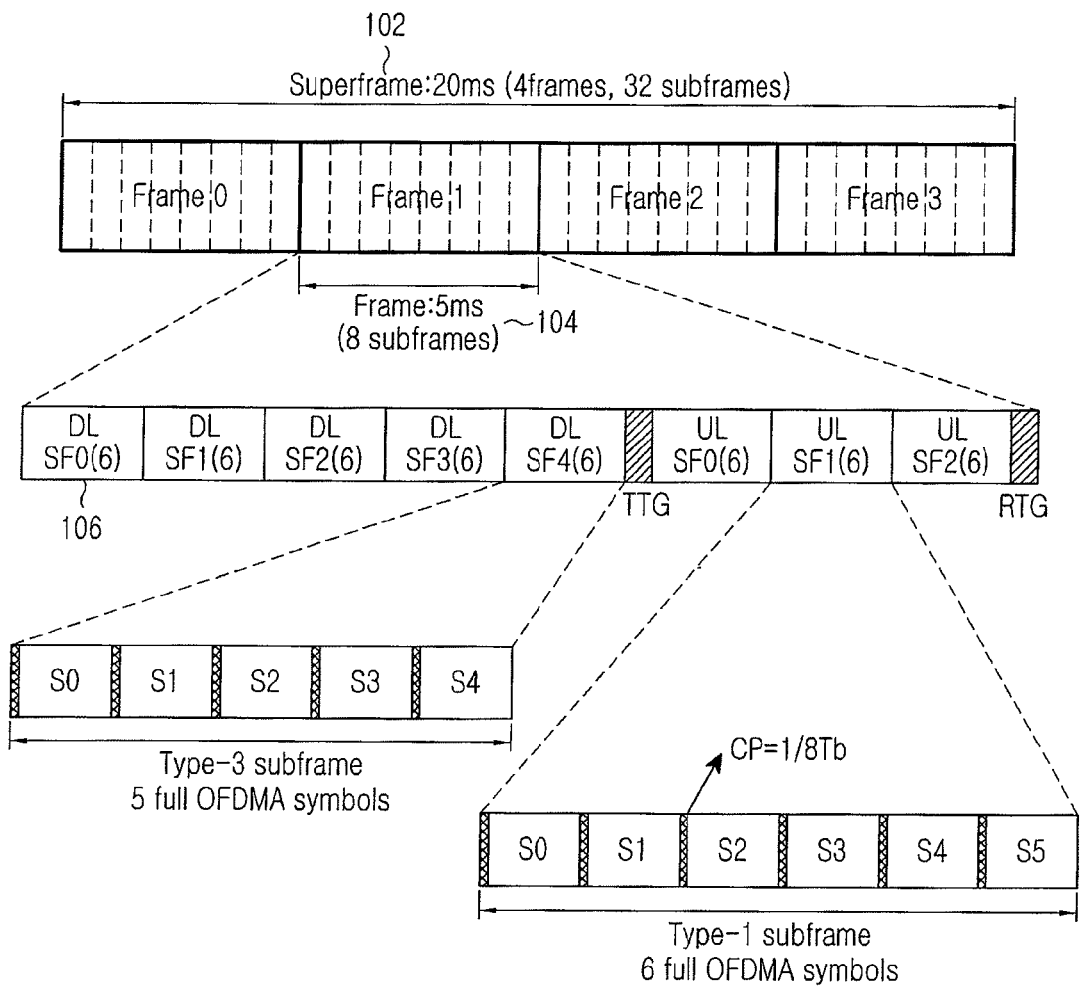
FIG. 1 is a view illustrating an example of a frame structure in accordance with an exemplary embodiment of the present invention.

FIG. 1 is a view illustrating an example of a frame structure according to an exemplary embodiment of the present invention. In the drawing, a Time Division Duplex (TDD) frame structure that can be used in the IEEE 802.16m system is shown by way of example.

Referring to FIG. 1, a superframe 102 includes 4 frames 104, and each frame 104 includes 8 subframes 106. Each subframe may have one of three types of subframe structures, that is, type 1 including 6 Orthogonal Frequency Division Multiple Access (OFDMA) symbols, type 2 including 7 OFDMA symbols, and type 3 including 5 OFDMA symbols. All data are transmitted/received based on the three types of subframe structures.

As an example of the frame, a TDD frame structure is shown, which has a Cyclic Prefix (CP) corresponding to ⅛ of an OFDMA symbol length in 5, 10, and 20 MHz bands, and has a DL:UL ratio of 5:3.

Figure 2:
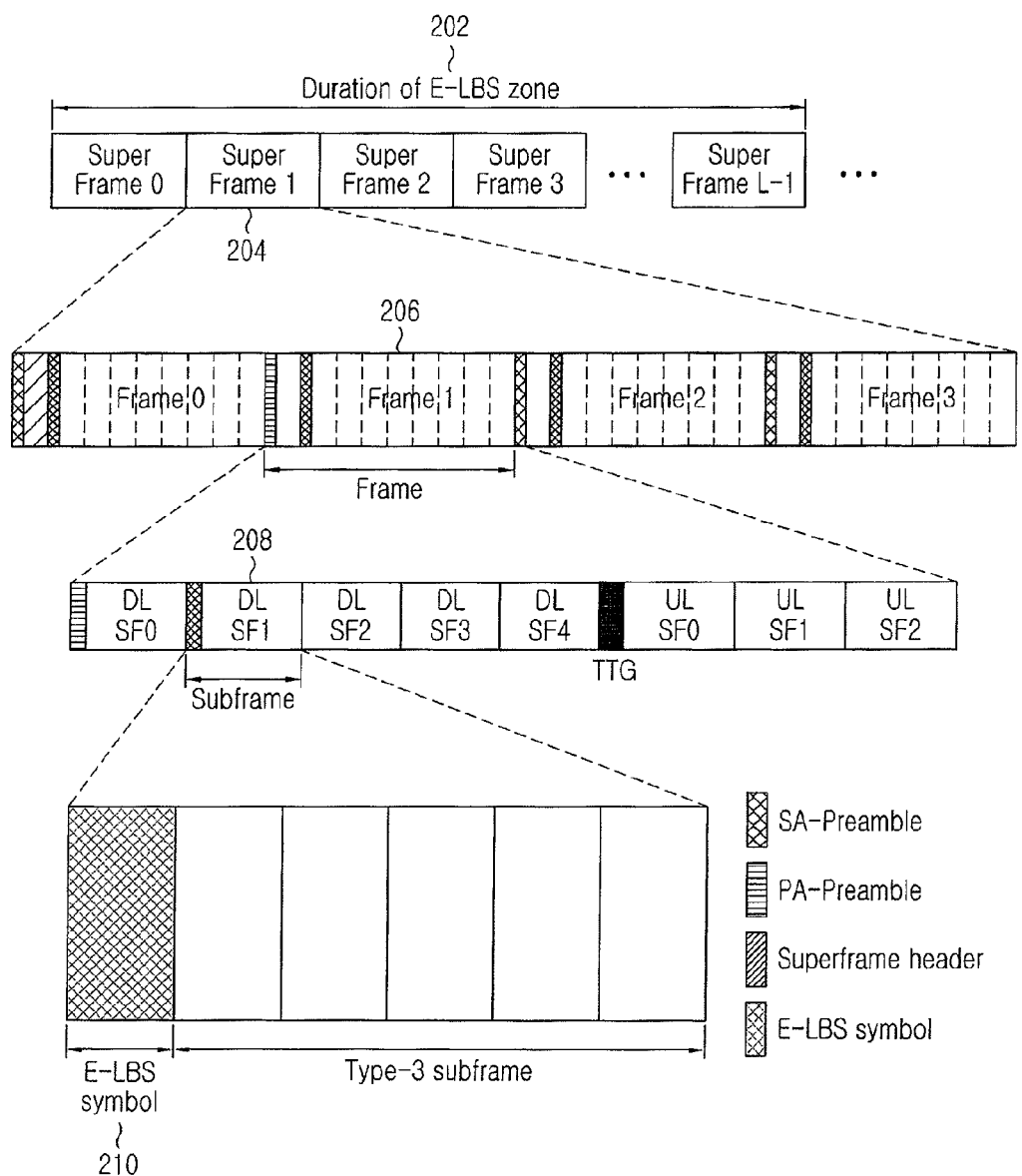
FIG. 2 is a view illustrating a superframe structure for a Location Based Service (LBS) operation in accordance with an exemplary embodiment of the present invention.

FIG. 2 is a view illustrating a superframe structure for an LBS operation according to an exemplary embodiment of the present invention. Although, by way of example, reference is made to the TDD frame structure shown in FIG. 1, it is obvious that various frame structures may be employed according to used bands, CP lengths, DL:UL ratios, duplex modes, and the like.

Referring to FIG. 2, the second frame within each superframe carries a Primary Advanced (PA) preamble, and the other frames carry a Secondary Advanced (SA) preamble. As is well-known in the art, these preambles are a series of predefined symbols for use in synchronization and equalization. The PA preamble provides basic BS information, such as a BS type and BandWidth (BW) information, and the SA preamble provides additional BS information. The first frame may be specified to carry a SuperFrame Header (SFH) including essential system parameters and system configuration information.

At least one specific superframe 204 (for example, the second superframe, that is, superframe 1) among L superframes constituting one duration 202 for an LBS operation is set as an LBS zone, and one or two OFDMA symbols at a fixed position, for example, one or two OFDMA symbols of the second subframe 208, are used as an LBS symbol for each frame 206 within the superframe 204. The LBS symbol is referred to as an "Enhanced LBS (E-LBS) symbol" 210 when used for an Advanced Ai Interface (AAI).

The other OFDMA symbols of the subframe to which the LBS symbol belongs can be used in data transmission/reception. However, since at least 5 OFDMA symbols are required for data transmission/reception, it is preferable not to allocate the LBS symbol to a type 3 subframe. When one LBS symbol is allocated to a type 2 subframe, the other symbols within the subframe constitute a type 1 subframe. When two LBS symbols are allocated to a type 2 subframe, the other symbols within the subframe constitute a type 3 subframe. Similarly, when one LBS symbol is allocated to a type 1 subframe, the other symbols within the subframe constitute a type 3 subframe.

When the first subframe of each superframe carries an SFH, a position where an LBS symbol is located may be selected from among subframes other than the first subframe. As an exemplary example, an LBS symbol may be located in the first or last symbol within each subframe. However, it is obvious that the position of an LBS symbol is not limited thereto, and may be determined according to a frame structure, the intention of a designer, and the like.

The position of a subframe in which an LBS symbol exists may vary according to a frame structure. Since a frame structure is different according to variables such as a bandwidth, and subframes constituting each frame have different types according to frame structures, as mentioned above, the position (that is, subframe number) of a subframe in which an LBS symbol exists within each frame may be different. The position of a subframe for an LBS symbol may also be affected by the position of a midamble used in a Multiple Input Multiple Output (MIMO) system, in addition to a frame structure.

There are 4 LBS symbols per superframe, and BSs transmit respective reference signals (or beacon signals) according to their unique patterns by using the LBS symbols. With regard to this, an SA preamble may be used as the reference signal, or a reference signal that is designed for LBS separately from an SA preamble may be transmitted. FIG. 2 illustrates a case where a reference signal exists separately from an SA preamble.

Since there are 4 LBS symbols per superframe, the LBS symbols may be allocated on the basis of a BS IDentifier (BS ID) or a BS index. As an example, when LBS symbols located in frames within a superframe have numbers 0, 1, 2, and 3 in that order, a corresponding BS can transmit a reference signal for LBS in a symbol interval having a number corresponding to the remainder of division of its BS ID by 4. That is, respective BSs transmit their reference signals through respective allocated LBS symbols in order of frames. For example, a first group of BSs transmit their reference signals through a specified LBS symbol of the first subframe, a second group of BSs transmit their reference signals through a specified LBS symbol of the second subframe, a third group of BSs transmit their reference signals through a specified LBS symbol of the third subframe, and a fourth group of BSs transmit their reference signals through a specified LBS symbol of the fourth subframe. Within each frame, BSs of groups other than a corresponding group wait without transmitting any signal through a specified LBS symbol. As another example, a reference signal with a random pattern, prearranged between a BS and an MS, may be allocated to each LBS symbol according to BSs.

In order to employ an LBS zone and an LBS symbol in a system, it is preferable to provide all MSs with LBS-related information indicating whether or not an LBS zone exists and its allocation. The LBS-related information may be periodically transmitted or broadcast from each BS through physical layer signaling or upper layer signaling.

Examples of LBS signaling include two methods. A first method uses SFH transmitted from superframe to superframe, and a second method uses a Medium Access Control (MAC) message called Advanced Air Interface System Configuration Descriptor (AAI_SCD). The SFH includes control information transmitted from superframe to superframe, and carries network entry/reentry information and other information essential to a system. The SFH is divided into Primary SFH (P-SFH) and Secondary SFH (S-SFH). The S-SFH includes three types of SubPacket (SP) Information Elements (IEs), that is, S-SFH SP1 IE, S-SFH SP2 IE, and S-SFH SP3 IE. These three types of IEs may have different transmission periods. Similar to S-SFH, AAI_SCD is a MAC message carrying information essential to a system, and carries additional essential control information that cannot be transmitted by S-SFH, for example, open-loop region information and a BS type. AAI_SCD is also periodically broadcast to all MSs.

various fields to be described below are merely by way of example and are not intended to limit the scope of the present invention in any way. Appropriate fields may be included in SFH carrying LBS-related information according to the communication protocol standard to which the present invention is applied, and the selection of a system designer or an operator. In the following, information fields associated with the exemplary embodiment of the present invention will be described in detail.

TABLE 1

| Syntax | Size (bit) | Notes |
|---|---|---|
| S-SFH IE format ( ) { | | |
| Start superframe offset where new information is used | 2 | |
| Frame configuration index | 6 | The mapping between value of this index and frame configuration is listed in Table X, X + 1, and X + 2 |
| If (Duplexing mode == FDD) { | | |
| UL carrier frequency | 6 | |
| UL bandwidth | 3 | |
| } | | |
| MSB bytes of 48 bit ABS MAC ID | 36 | Specifies 36 MSBs of BS ID |
| MAC protocol revision | 4 | version number of AAI supported on this channel |
| FFR partitioning info for DL region | 12 | For 20 MHz, DL_SAC(5 bits), DL_FPSC(3 bits), DL_FPC(4 bits) For 5 MHz, DL_SAC(3 bits), DL_FPSC(1 bit), DL_FPC(3 bits) |
| FFR partitioning info for UL region | 12 | For 20 MHz, UL_SAC(5 bits), UL_FPSC(3 bits), UL_FPC(4 bits) For 5 MHz, UL_SAC(3 bits), UL_FPSC(1 bit), UL_FPC(3 bits) |
| AMS Transmit Power Limitation level | 5 | Unsigned 5-bit integer. Specifies the maximum allowed AMS transmit power. Values indicate power levels in 1 dB steps starting from 0 dBm |
| $EIRP_{IR, min}$ | 5 | |
| LBS zone | 1 | If LBS zone bit = 1, LBS symbol exists and the subframe which is used for LBS is the subframe type-3. |
| If (LBS zone == 0) { | | |
| LBS subframe information | 3 | The position of subframe where LBS symbol exists |
| LBS symbol information | 1 | The position of LBS symbol 0b0: the first OFDM symbol in subframe 0b1: the last OFDM symbol in subframe |
| } | | |
| reserved | | |
| } | | |

As an example of using SFH, LBS-related information may be provided through S-SFH SP2 IE associated with network entry and discovery, among S-SFH IEs carried by S-SFH. As another example, another SP of S-SFH may be used.

The following LBS-related information may be included in S-SFH:
 LBS zone bit (1 bit): whether or not an LBS zone is set
 LBS subframe information (3 bits): the position of a subframe where an LBS symbol exists within each frame
 LBS symbol information (1 bit): the position of an LBS symbol within a corresponding subframe Here, the LBS symbol information indicates whether an LBS symbol is located in the first symbol or in the last symbol within a corresponding subframe. When the position of an LBS symbol within a corresponding subframe is prearranged as the first symbol, the last symbol, or any other symbol, the LBS symbol information may be omitted.

An S-SFH format according to an exemplary embodiment of the present invention is shown below in Table 1. Of course, "Start superframe offset" indicates the position of a superframe to which S-SFH IE including new information is applied, and "frame configuration index" indicates a mapping value of one of frame configurations listed in a predetermined table. When Frequency Division Duplexing (FDD) is used as a duplexing mode, "UL carrier frequency" and "bandwidth" are included. Additionally, the 36 Most Significant Bits (MSBs) of a 48-bit MAC ID, a MAC protocol version indicating the version of an AAI supported on a current channel, Fractional Frequency Reuse (FFR) partitioning information for DL and UL regions, a transmit power limitation level of an MS, and a minimum value of Effective Isotropically Radiated Power (EIRP) are included.

"LBS zone bit" indicates whether or not an LBS zone is enabled. When "LBS zone bit" is set to a predetermined value, for example, a value of "1", it indicates that there is an LBS symbol in each superframe used for LBS, and a subframe used for LBS is of a predetermined type, for example, type 3. When "LBS zone bit" is set to "1", at least one of "LBS subframe information" and "LBS symbol information" may be included. "LBS subframe information" indicates the position of a subframe where an LBS symbol exists within each frame. "LBS symbol information" indicates the position of an LBS symbol within a subframe indicated by "LBS subframe information". As an example, when "LBS symbol information" corresponds to "0b0", it indicates that the first symbol is used as an LBS symbol within a corresponding subframe. Further, when "LBS symbol information" corresponds to "0b1", it indicates that the last symbol is used as an LBS symbol within a corresponding subframe. As another example, "LBS symbol information" may indicate various symbol positions within a corresponding subframe. As yet another example, when the position of a subframe where an LBS symbol exists and the position of an LBS symbol within a corresponding subframe are prearranged, "LBS subframe information" and "LBS symbol information" may be omitted.

In the case of using AAI_SCD, "LBS zone bit" and at least one of "LBS subframe information" and "LBS symbol information" are included similar to SFH. The duration and starting point of an LBS zone may be determined differently from the transmission period and staring point of AAI_SCD, and in such a case, AAI_SCD may include the number of a superframe from which an LBS zone is started and a duration during which the LBS_zone exists, that is, the number of superframes covering the duration of the LBS zone.

An AAI_SCD format according to an exemplary embodiment of the present invention is shown below in Table 2. Of course, various fields to be described below are merely by way of example and are not intended to limit the scope of the present invention in any way. Appropriate fields may be included in AAI_SCD carrying LBS-related information according to the communication protocol standard to which the present invention is applied, and the selection of a system designer or an operator. In the following, information fields associated with the exemplary embodiment of the present invention will be described in detail.

TABLE 2

```
AAI_SCDMessage :: SEQUENCE {
Change Configuration Change    INTEGER (0~15)
BS_Restart_Count               INTEGER (0~15)
SA_PreamblePartitionforBStype
Trigger TLV encoding :: = SEQUENCE { }
DefaultHORSSI_CINRaveraggingparameters :: = SEQUENCE { }
NormalizedCINR :: = SEQUENCE { }
LBS_Parameters :: = SEQUENCE {
LBS_zone-ON                    INTEGER (0 . . . 1) OPTIONAL
LBS_subframe_position          INTEGER (0 . . . 7) OPTIONAL
LBS_symbol_position            INTEGER (0 . . . 1) OPTIONAL
LBS_zone_start_superframe      INTEGER (0 . . . 255) OPTIONAL
number
LBS zone duration              INTEGER (0 . . . 255) OPTIONAL
}
Parameters_GRA :: = SEQUENCE { }
PeriodicRNGParameters :: = SEQUENCE { }
GAMMA_IOT_FP0                  INTEGER (0 . . . 15) OPTIONAL
GAMMA_IOT_FP1                  INTEGER (0 . . . 15) OPTIONAL
GAMMA_IOT_FP2                  INTEGER (0 . . . 15) OPTIONAL
GAMMA_IOT_FP3                  INTEGER (0 . . . 15) OPTIONAL
Alpha (α)                      INTEGER (0 . . . 7) OPTIONAL
Beta (β)                       INTEGER (0 . . . 1) OPTIONAL
SINRmin                        INTEGER (0 . . . 15) OPTIONAL
}
```

"Change Configuration Change (CCC)" indicates whether or not information included in an AAI_SCD message is changed, "BS_Restart_Count" denotes a BS restart count, "SA_PreamblePartitionforBStype" indicates SA preamble partitioning information according to a BS type, "Trigger TLV encoding" indicates trigger conditions for Type, Length and Value (TLV) encoding, "DefaultHORSSI_CINRaveragingparameters" denotes parameters for Receive Signal Strength Indicator (RSSI) and Carrier to Interference and Noise Ratio (CINR) averaging for default HandOver (HO), and "NormalizedCINR" indicates information for CINR normalization.

"Parameter_GRA" denotes parameters for Group Resource Allocation (GRA), "PeriodcRNGParameters" denotes parameters for periodic ranging, "GAMMA_IOT_FP0~3" denote IoT (Interference over Thermal) control parameters for frequency partitioning, "α" and "β" denote parameters used for power control, and "SINRmin" denotes a minimum Signal to Interference and Noise Ratio (SINR).

"LBS_zone_ON" indicates the above-mentioned LBS zone bit, "LBS_subframe_position" indicates LBS subframe information, and "LBS_symbol_position" indicates LBS symbol information. When "LBS_zone_ON" is set to a predetermined value, for example, a value of "1", it indicates that there is an LBS symbol in superframes used for LBS, and a subframe used for LBS is of a predetermined type, for example, type 3. When "LBS_zone_ON" is set to "1", at least one of "LBS_subframe_position" and "LBS_symbol_Position" may be included. "LBS_subframe_position" indicates the position of a subframe where an LBS symbol exists within each frame. "LBS_symbol_position" indicates the position of an LBS symbol within a subframe indicated by "LBS_subframe_position". As an example, when "LBS_symbol_position" corresponds to "0b0", it indicates that the first symbol is used as an LBS symbol within a corresponding subframe. Further, when "LBS_symbol_position" corresponds to "0b1", it indicates that the last symbol is used as an LBS symbol within a corresponding subframe.

"LBS_zone_start_superframe number" denotes the number of a superframe from which an LBS zone is started, "LBS_zone_duration" denotes the length of time during which an LBS zone is maintained, that is, the number of superframes covering the duration of an LBS zone. As another example, "LBS_symbol_position" may indicate more various symbol positions within a corresponding subframe. As yet another example, when the position of a subframe where an LBS symbol exists and the position of an LBS symbol within a corresponding subframe are prearranged, "LBS_subframe_position" and "LBS_symbol_position" may be omitted.

Figure 3:
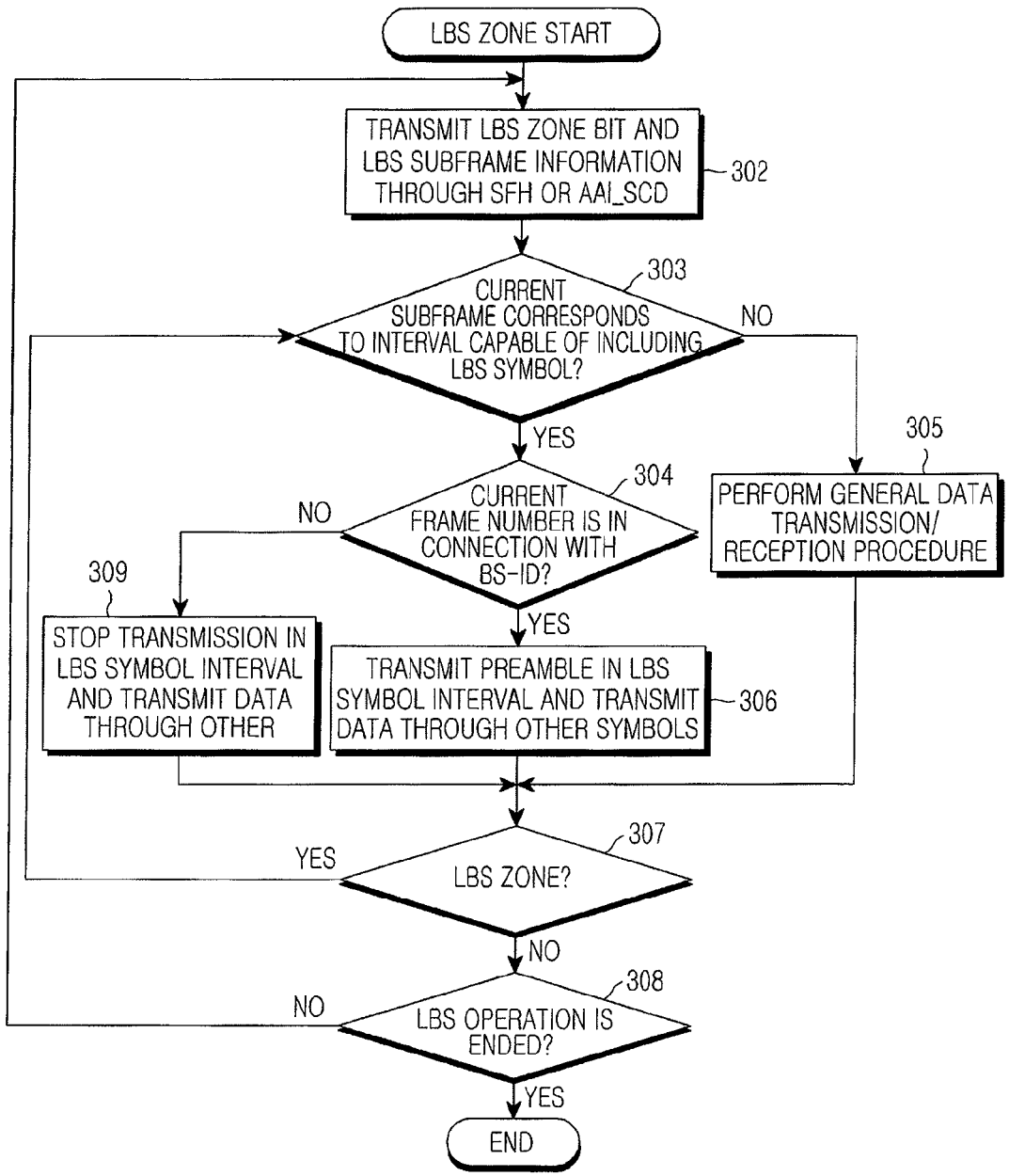
FIG. 3 is a flowchart illustrating an LBS operation of a Base Station (BS) in accordance with an exemplary embodiment of the present invention.

FIG. 3 is a flowchart illustrating an LBS operation of a BS according to an exemplary embodiment of the present invention.

Referring to FIG. 3, when one duration for the LBS operation is started, the BS broadcasts LBS-related information, for example, at least one of an LBS zone bit, LBS subframe information, and LBS symbol information, to all MSs through SFH or AAI_SCD in step 302. Here, in order to start to apply an LBS zone, the LBS_zone bit is set to a value indicating that the LBS zone has been set. In step 303, based on the LBS subframe information, the BS determines if a subframe capable of including an LBS symbol is reached. That is, the BS determines if a current subframe can include an LBS symbol. When it is determined in step 303 that a current subframe cannot include an LBS symbol, the BS can use all symbols of a corresponding subframe to perform a data transmission/reception operation in step 305.

On the other hand, when it is determined in step 303 that a current subframe can include an LBS symbol, the BS determines in step 304 if the frame number of the current frame is in connection with its BS ID, in order to determine whether to transmit its reference signal through a corresponding LBS symbol. As an example, when the remainder of division of its BS ID by the frame number equals a predetermined value, the BS determines that the frame number of the current frame is in connection with its BS ID. The predetermined value is uniquely or non-overlappingly allocated in advance to each BS within the limits of the possible. When the BS determines in step 304 that the frame number of the current frame is in connection with its BS ID, the BS proceeds to step 306 and transmits an SA preamble or a reference signal for LBS in an OFDMA symbol interval of the current subframe, which is allocated for an LBS symbol. Here, the position of an LBS symbol is indicated by the LBS symbol information. At the same time, the other symbols of the current subframe, excluding the LBS symbol, can be used for data transmission/reception when data is to be transmitted/received. On the other hand, when the BS determines in step 304 that the frame number of the current frame is not in connection with its BS ID, it waits without transmitting a reference signal, but performs data transmission/reception through the other symbols in step 309.

Subsequently, the BS determines in step 307 if the LBS zone has ended. If the BS determines in step 307 that the LBS zone has not ended, and the BS returns to step 303. On the other hand, when the BS determines in step 307 that the LBS zone is ended, the BS proceeds to step 308 and determines if it continues to perform the LBS operation. If the BS determines in step 308 that it continues to perform the LBS operation, and the BS returns to step 302. On the other hand, when the BS determines in step 308 that the LBS operation does not need to be performed any longer, the BS terminates the LBS-related operation, and performs data transmission/reception by using all the symbols.

Figure 4:
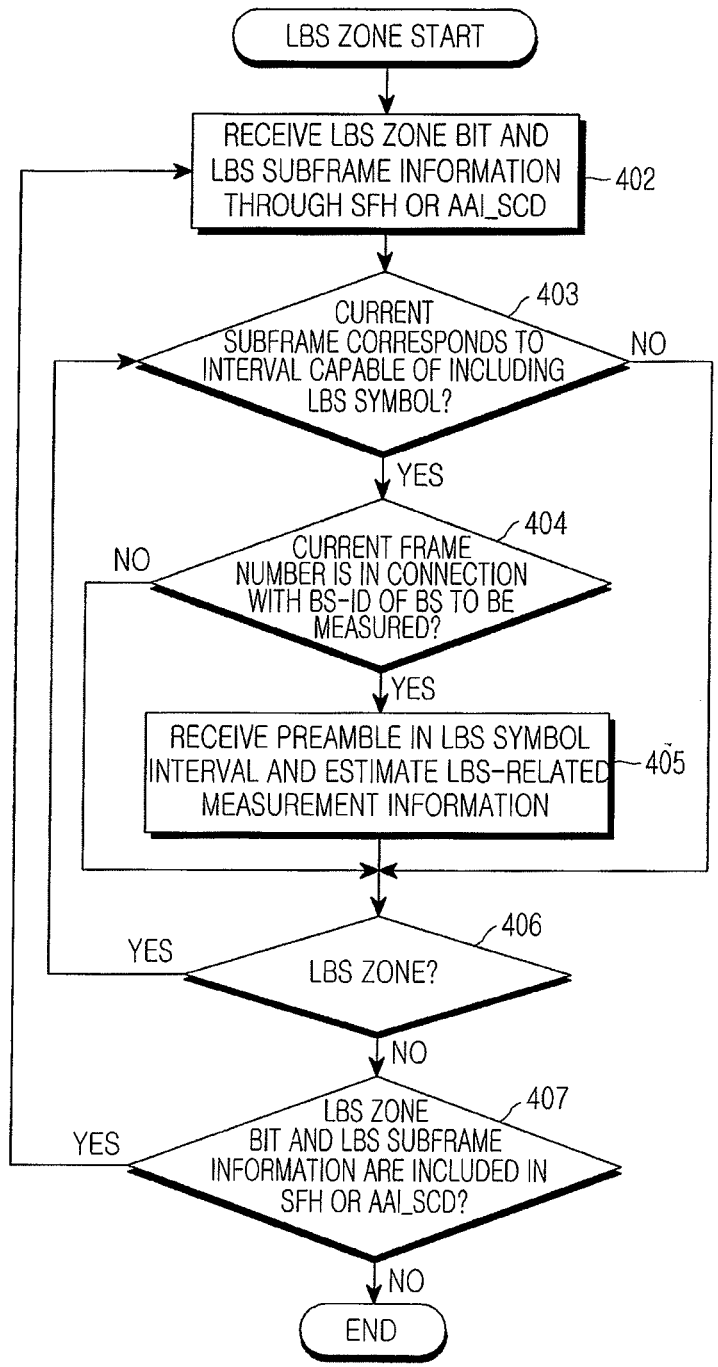
FIG. 4 is a flowchart illustrating an LBS operation of a Mobile Station (MS) in accordance with an exemplary embodiment of the present invention.

FIG. 4 is a flowchart illustrating an LBS operation of an MS according to an exemplary embodiment of the present invention.

Referring to FIG. 4, in step 402, the MS receives SFH or AAI_SCD including LBS-related information, for example, at least one of an LBS zone bit, LBS subframe information, and LBS symbol information, from a BS, and confirms the LBS zone bit indicating that an LBS zone has been set. In step 403, based on the LBS subframe information, the MS determines if a subframe capable of including an LBS symbol is reached, that is, if a current subframe can include an LBS symbol. When the MS determines in step 403 that a current subframe cannot include an LBS symbol, the MS proceeds to step 406.

On the other hand, when the MS determines in step 403 that a current subframe can include an LBS symbol, the MS determines in step 404 if the frame number of the current frame is in connection with the BS ID of a corresponding BS to be measured. As an example, when the remainder of division of a BS ID by the frame number equals a predetermined value allocated to a corresponding BS, the MS determines that the frame number of the current frame is in connection with the BS ID of the corresponding BS. Here, the MS acquires and stores in advance information on neighbor BSs to be measured, that is, their BS IDs, values allocated to the BSs, and the like, through a neighbor advertisement (NBR_ADV) message or an LBS advertisement (LBS_ADV) message broadcasted from a serving BS.

When the MS determines in step 404 that the frame number of the current frame is in connection with the BS to be measured, the MS proceeds to step 405 and receives an SA preamble or a reference signal for LBS in an OFDMA symbol interval allocated for an LBS symbol, and measures values necessary for LBS, such as TDOA or RSSI. The measured values are used for the MS to estimate its own location or are reported to the BS or a location server through an LBS response (LBS_RSP) message or a SCaN REPort (SCN_REP) message. On the other hand, when the MS determines in step 404 that the frame number of the current frame is not in connection with the BS ID of the BS to be measured, the MS proceeds to step 406 without measuring the values.

In step 406, the MS determines if the LBS zone is ended, that is, if it is time for the BS to transmit new SFH or AAI_SCD. When the MS determines in step 406 that it is not time for the BS to transmit new SFH or AAI_SCD, the MS returns to step 403 because the LBS zone is maintained and thus the LBS-related information received in step 402 is still effective. On the other hand, when the MS determines in step 406 that the LBS zone is ended, that is, it is time for the BS to transmit new SFH or AAI_SCD, the MS proceeds to step 407 to receive a new SFH or AAI_SCD and determine if the LBS zone bit and LBS subframe information are included in the new SFH or AAI_SCD. If the MS determines in the step 406 that the LBS zone bit and LBS subframe information is included in the new SFH or AAI_SCD, the MS returns to step 402 in order to acquire new LBS-related information from the new SFH or AAI_SCD. As another example, the MS decodes a newly received SFH or AAI_SCD to thereby check if the newly received SFH or AAI_SCD includes LBS-related information, and then proceeds to step 403 when SFH or AAI_SCD includes LBS-related information.

Figure 5:
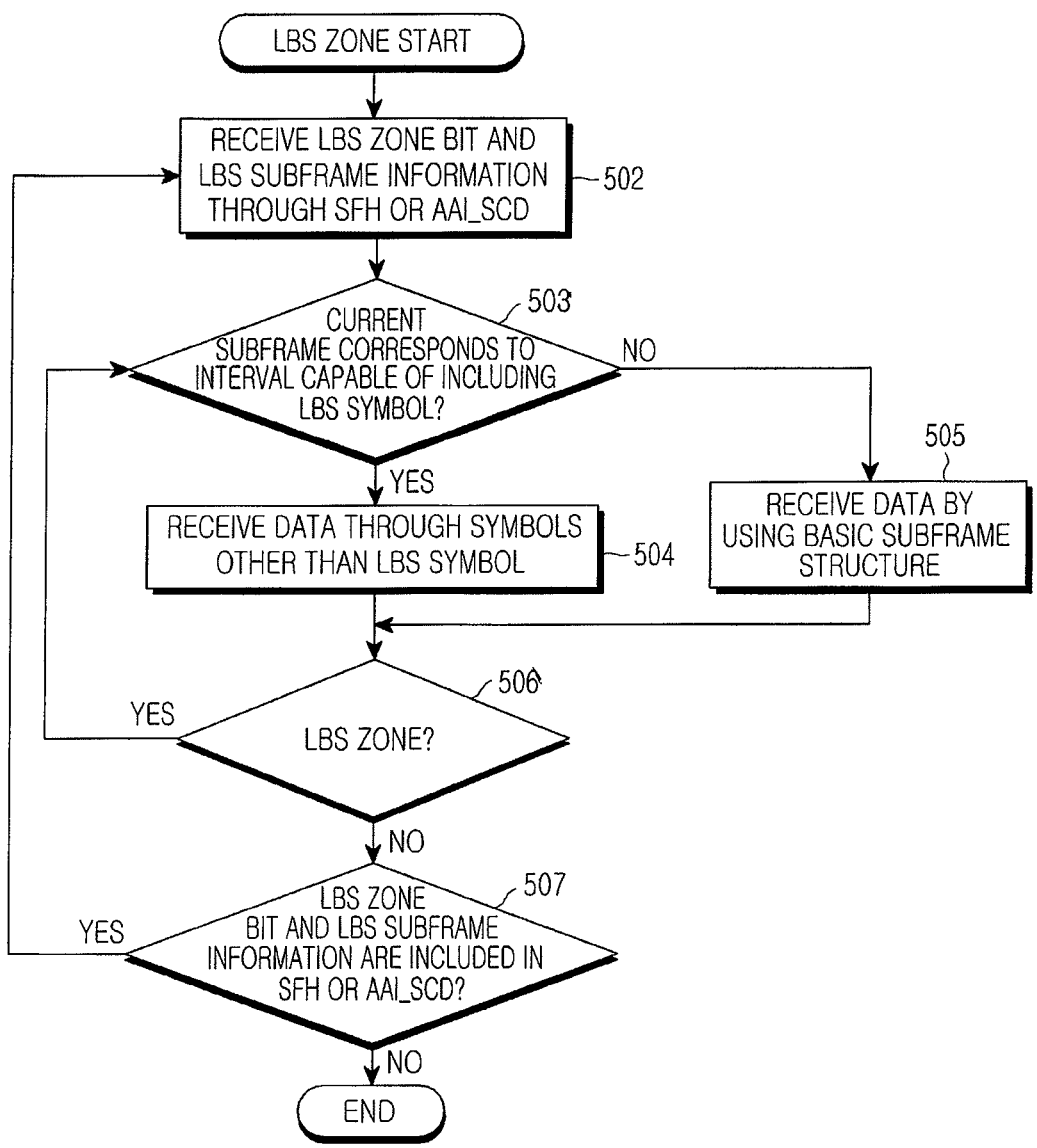
FIG. 5 is a flowchart of a data transmission/reception operation of an MS in accordance with an exemplary embodiment of the present invention.

FIG. 5 is a flowchart of a data transmission/reception operation of an MS according to an exemplary embodiment of the present invention.

Referring to FIG. 5, in step 502, the MS receives SFH or AAI_SCD including LBS-related information, for example, at least one of an LBS zone bit, LBS subframe information, and LBS symbol information, from a BS, and confirms the LBS zone bit indicating that an LBS zone has been set. In step 503, based on the LBS subframe information, the MS determines if a subframe capable of including an LBS symbol is reached, that is, if a current subframe can include an LBS symbol. When it is determined in step 503 that a current subframe can include an LBS symbol, the MS proceeds to step 504 and performs data transmission/reception through the other symbols of the current subframe, which are not assigned for an LBS symbol indicated by the LBS symbol information. On the other hand, when it is determined in step 503 that the current subframe cannot include an LBS symbol, the MS proceeds to step 505 and performs typical data transmission/reception by means of all the symbols of the current subframe.

In step 506, the MS determines if the LBS zone is ended, that is, if a new transmission period of SFH or AAI_SCD is reached. When it is determined in step 506 that a new transmission period of SFH or AAI_SCD is not reached, the MS returns to step 503 because the LBS-related information received in step 502 is still effective. On the other hand, when it is determined in step 506 that a transmission period of new SFH or AAI_SCD is reached, the MS proceeds to step 507 to receive a new SFH or AAI_SCD and determine if the LBS-related information are included in the new SFH or AAI_SCD. If the MS determines in step 507 that the LBS-related information are included in the new SFH or AAI_SCD, the MS returns to step 502 in order to acquire new LBS-related information from the new SFH or AAI_SCD. As another example, the MS decodes a newly received SFH or AAI_SCD to thereby check if the newly received SFH or AAI_SCD includes LBS-related information, and then proceeds to step 503 when SFH or AAI_SCD includes LBS-related information.

Figure 6:
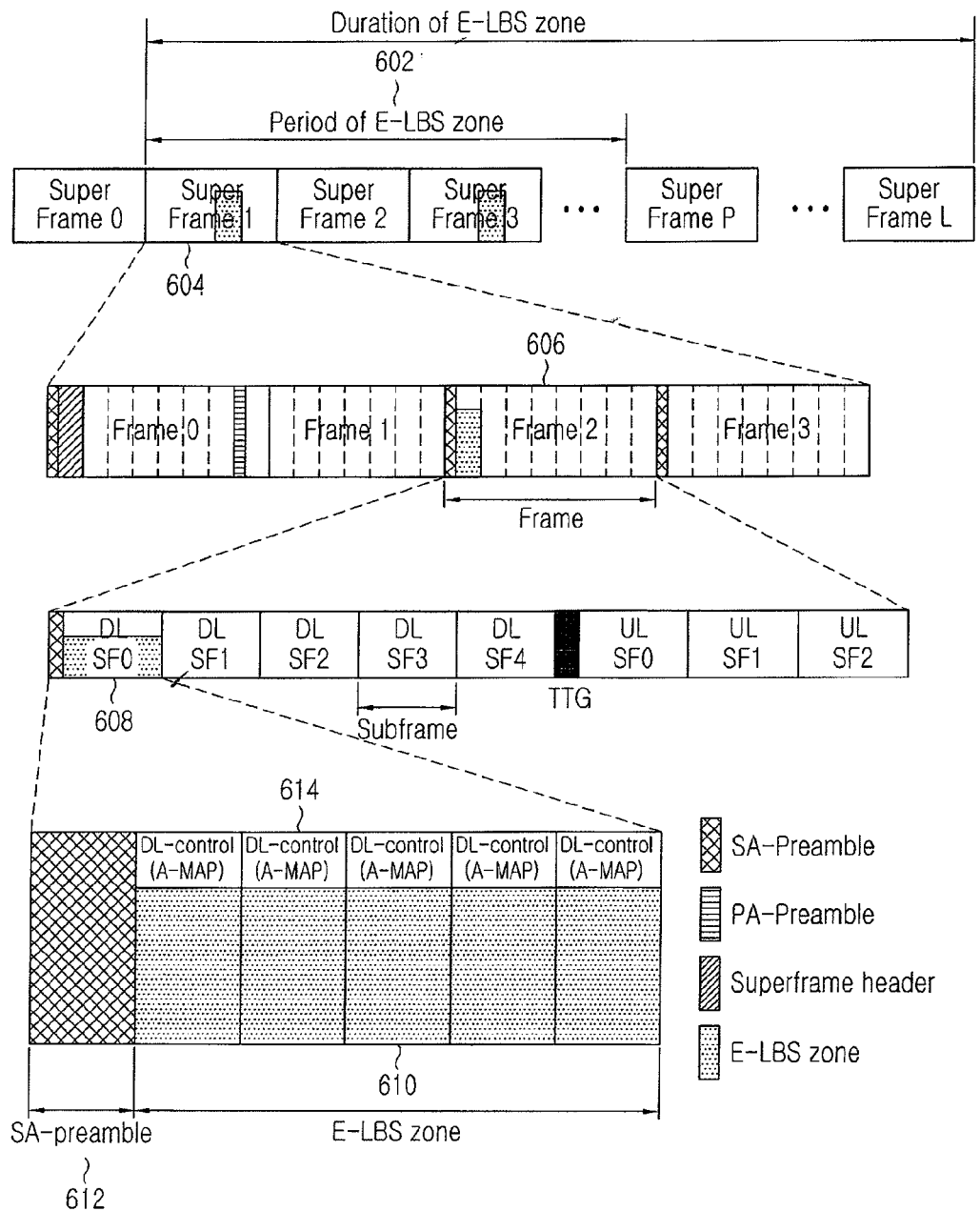
FIG. 6 is a view illustrating a superframe structure for an LBS operation in accordance with an exemplary embodiment of the present invention.

FIG. 6 is a view illustrating a superframe structure for an LBS operation according to an exemplary embodiment of the present invention. Although, by way of example, reference is made to the TDD frame structure shown in FIG. 1, it is obvious that various frame structures may be employed according to used bands, CP lengths, DL:UL ratios, duplex modes, and the like.

Referring to FIG. 6, the second frame within each superframe 604 carries a PA preamble, and the other frames carry an SA preamble. The first frame may be specified to carry an SFH including system information and the like.

As shown in the drawing, superframes for an LBS zone (for example, superframes 1 and 3) may periodically exist, and the position of a subframe for LBS may be fixedly specified within each superframe. In the exemplary embodiment shown in the drawing, at least one specific superframe (for example, the second superframe, that is, superframe 1 604) among superframes constituting one period 602 for an LBS operation is set as an LBS zone, and OFDMA symbols at a fixed position within a specific frame (as an example, the second frame from the back, that is, frame 2 606) of superframe 1, for example, a predetermined number of OFDMA symbols of the first subframe 608, excluding the first symbol used for the existing purpose (that is, used for transmission of an SA preamble 612), are used for LBS. These OFDMA symbols are referred to as "LBS symbols". The LBS symbols are referred to as "enhanced LBS (E-LBS) symbols" when used for an AAI.

FIG. 6 shows a case where 5 OFDMA symbols 610 are used for LBS. A reference signal for LBS (that is, an LBS signal) is transmitted through the OFDMA symbols 610, and a signal in the same form as the SA preamble 612 may be typically used as the LBS signal. Respective neighbor BSs are in connection with the 5 OFDMA symbols according to a specific pattern. Each neighbor BS transmits its LBS signal only through an OFDMA symbol with which it is in connection, and does not transmit its LBS signal through the other OFDMA symbols.

In the existing technology, since any other signal cannot be transmitted together in an interval where an SA preamble is to be transmitted, an Advance MAP (A-MAP) message, such as a DL/UL allocation A-MAP message indicating DL/UL resource allocation and an HARQ feedback A-MAP message indicating resource allocation for HARQ ACK/NACK, cannot be transmitted in such an interval, which has much influence on other data communication operations including HARQ timing.

In order to minimize this influence, in an exemplary embodiment of the present invention, an LBS signal is punctured on the frequency axis in a subframe interval including an LBS symbol, and thereby a DL control signal 614, such as an A-MAP message, can be transmitted together. That is, an LBS signal is transmitted through subcarriers other than subcarriers that are used to transmit an A-MAP message. In this case, there is no need to transmit an A-MAP message for DL allocation because there cannot be a DL data burst, but A-MAP messages other than the A-MAP message for DL allocation can be transmitted in the same subframe interval as the LBS signal. That is, a non-user specific A-MAP message, a UL allocation A-MAP message for UL resource allocation, a power control A-MAP message, an HARQ feedback A-MAP message for a UL burst, and the like can be transmitted together with the LBS signal.

Additionally, in order to improve signal reception performance, neighbor BSs may use a common permutation rule. That is, each BS may permute resource units within a transmission resource for use in communication with an MS according to a predetermined permutation rule. In the case of a subframe within an LBS zone, neighbor BSs use resources permuted in the same manner to transmit an A-MAP message. In this way, the number of subcarriers colliding with other reference signals can be reduced, and the influence of A-MAP transmission on a reference signal can also be reduced.

A field indicating whether or not a common permutation rule is applied to neighbor BSs may be notified in advance to an MS through a field, which indicates whether or not an LBS zone exists, and information, which indicates a region where an LBS exists, in SFH or AAI_SCD. Further, when the field indicating whether or not an a common permutation rule is applied is enabled in SFH or AAI_SCD, that is, when neighbor BSs use an identical permutation base as the input of a permutation equation for resource units, a field indicating the permutation base may be additionally used. Thus, dissimilar to a normal region where permutation according to a specific rule is performed for each cell, neighbor BSs use the same permutation rule in an LBS zone, and an MS must recognize in advance the permutation rule used by the BSs.

The following LBS-related information may be included in SFH or AAI_SCD:

LBS_zone-ON: whether or not an LBS zone is applied

LBS_zone_start_superframe number: the position of a superframe from which an LBS zone starts to be applied LBS_zone_duration: the number of superframes covering an LBS zone LBS_zone_period: the period of an LBS zone Common_perm_base_flag: whether or not a common permutation rule is applied Common_perm_base: a common permutation base when a common permutation rule is applied An S-SFH format according to an exemplary embodiment of the present invention is shown below in Table 3. Of course, various fields to be described below are merely by way of example and are not intended to limit the scope of the present invention in any way. Appropriate fields may be included in SFH carrying LBS-related information according to the communication protocol standard to which the present invention is applied, and the selection of a system designer or an operator. In the following, information fields associated with the exemplary embodiment of the present invention will be described in detail.

TABLE 3

| Syntax | Size (bit) | Notes |
|---|---|---|
| S-SFH IE format ( ) { | | |
| Start superframe offset where new information is used | 2 | |
| Frame configuration index | 6 | The mapping between value of this index and frame configuration is listed in Table X, X + 1, and X + 2 |

TABLE 3-continued

| Syntax | Size (bit) | Notes |
|---|---|---|
| If (Duplexing mode == FDD) { | | |
| UL carrier frequency | 6 | |
| UL bandwidth | 3 | |
| } | | |
| MSB bytes of 48 bit ABS MAC ID | 36 | Specifies 36 MSBs of BS ID |
| MAC protocol revision | 4 | version number of AAI supported on this channel |
| FFR partitioning info for DL region | 12 | For 20 MHz, DL_SAC(5 bits), DL_FPSC(3 bits), DL_FPC(4 bits)<br>For 5 MHz, DL_SAC(3 bits), DL_FPSC(1 bit), DL_FPC(3 bits) |
| FFR partitioning info for UL region | 12 | For 20 MHz, UL_SAC(5 bits), UL_FPSC(3 bits), UL_FPC(4 bits)<br>For 5 MHz, UL_SAC(3 bits), UL_FPSC(1 bit), UL_FPC(3 bits) |
| AMS Transmit Power Limitation level | 5 | Unsigned 5-bit integer. Specifies the maximum allowed AMS transmit power. Values indicate power levels in 1 dB steps starting from 0 dBm |
| EIRPIR, min | 5 | |
| LBS zone | 1 | If LBS zone bit = 1, LBS symbol exists and the subframe which is used for LBS is the subframe type-3. |
| If (LBS zone == 1) { | | |
| LBS zone start superframe number | 8 | The superframe number where LBS zone starts |
| LBS zone duration | 8 | The number of superframes where LBS zone exists |
| LBS zone period | 4 | The period of LBS zone |
| Common_perm_base_flag | 1 | 0b0: using the ABS's original perm base<br>0b1: using the common perm base |
| If (Common_perm_base_flag == 1) { | | The case using common permutation base |
| Common_perm_base | | |
| } | | |
| } | | |
| reserved | | |
| } | | |

"Start superframe offset" indicates the position of a superframe to which S-SFH IE including new information is applied, and "frame configuration index" indicates a mapping value of one of frame configurations listed in a predetermined table. When FDD is used as a duplexing mode, "UL carrier frequency" and "bandwidth" are included. Additionally, 36 MSBs of a 48-bit MAC ID, a MAC protocol version indicating the version of an AAI supported on a current channel, FFR partitioning information for DL and UL regions, a transmit power limitation level of an MS, and a minimum value of EIRP are included.

"LBS zone bit" indicates whether or not an LBS zone is enabled. When "LBS zone bit" is set to a predetermined value, for example, a value of "1", it indicates that there are LBS symbols in superframes used for LBS, and a subframe used for LBS is of a predetermined type, for example, type 3. When "LBS zone bit" is set to "1", for example, at least one of "LBS_zone_start_superframe number", "LBS_zone_duration", and "LBS_zone_period" is included as information indicating the position of an LBS zone. In addition, when neighbor BSs use a common permutation rule in a subframe of an LBS zone, "Common_perm_base_flag" and "Common_perm_base" may be further included. As another example, at least one of the LBS information may be omitted when prearranged between a BS and an MS. For example, when the number of superframes covering an LBS zone is predetermined as T, "LBS_zone_duration" is omitted, and "LBS_zone_duration" may be further omitted sue to transmission of "LBS_zone_start_superframe number".

In the case of using AAI_SCD, fields indicating the position of an LBS zone and information related to common permutation rule are included in similar to SFH.

An AAI_SCD format according to an exemplary embodiment of the present invention is shown below in Table 4. Of course, various fields to be described below are merely by way of example and are not intended to limit the scope of the present invention in any way. Appropriate fields may be included in AAI_SCD carrying LBS-related information according to the communication protocol standard to which the present invention is applied, and the selection of a system designer or an operator. In the following, information fields associated with the exemplary embodiment of the present invention will be described in detail.

TABLE 4

```
AAI_SCDMessage :: SEQUENCE {
Change Configuration Change      INTEGER (0~15)
BS_Restart_Count                 INTEGER (0~15)
SA_PreamblePartitionforBStype
Trigger TLV encoding :: = SEQUENCE { }
DefaultHORSSI_CINRaveraggingparameters :: = SEQUENCE { }
NormalizedCINR :: = SEQUENCE { }
LBS_Parameters :: = SEQUENCE {
LBS_zone-ON                      INTEGER (0 . . . 1) OPTIONAL
LBS_zone_start_superframe        INTEGER (0 . . . 255) OPTIONAL
number
LBS_zone_duration                INTEGER (0 . . . 255) OPTIONAL
LBS_zone_period                  INTEGER (0 . . . 15) OPTIONAL
Common_perm_base_flag            INTEGER(0 . . . 1) OPTIONAL
Common_perm_base                 INTEGER(0 . . . 255)OPTIONAL
}
```

TABLE 4-continued

```
Parameters_GRA :: = SEQUENCE { }
PeriodicRNGParameters :: = SEQUENCE { }
GAMMA_IOT_FP0          INTEGER (0 ... 15) OPTIONAL
GAMMA_IOT_FP1          INTEGER (0 ... 15) OPTIONAL
GAMMA_IOT_FP2          INTEGER (0 ... 15) OPTIONAL
GAMMA_IOT_FP3          INTEGER (0 ... 15) OPTIONAL
Alpha (α)              INTEGER (0 ... 7) OPTIONAL
Beta (β)               INTEGER (0 ... 1) OPTIONAL
SINRmin                INTEGER (0 ... 15) OPTIONAL
}
```

"Change Configuration Change (CCC)" indicates whether or not information included in an AAI_SCD message is changed, "BS_Restart_Count" denotes a BS restart count, "SA_PreamblePartitionforBStype" indicates SA preamble partitioning information according to a BS type, "Trigger TLV encoding" indicates trigger conditions for TLV encoding, "DefualtHORSSI_CINRaveragingparameters" denotes parameters for RSSI and CINR averaging for default HO, and "NormalizedCINR" indicates information for CINR normalization.

"Parameter_GRA" denotes parameters for Group Resource Allocation (GRA), "PeriodcRNGParameters" denotes parameters for periodic ranging, "GAMMA_IOT_FP0~3" denote IoT control parameters for frequency partitioning, "α" and "β" denote parameters used for power control, and "SINRmin" denotes a minimum SINR.

The meanings of "LBS_zone_ON", "LBS_zone_start_superframe number", "LBS_zone_duration", "LBS_zone_period", "Common_perm_base_flag", and "Common_perm_base" have been already described above. Similar to the case of SFH, at least one of the above LBS-related information may be omitted when prearranged between a BS and an MS.

Figure 7:
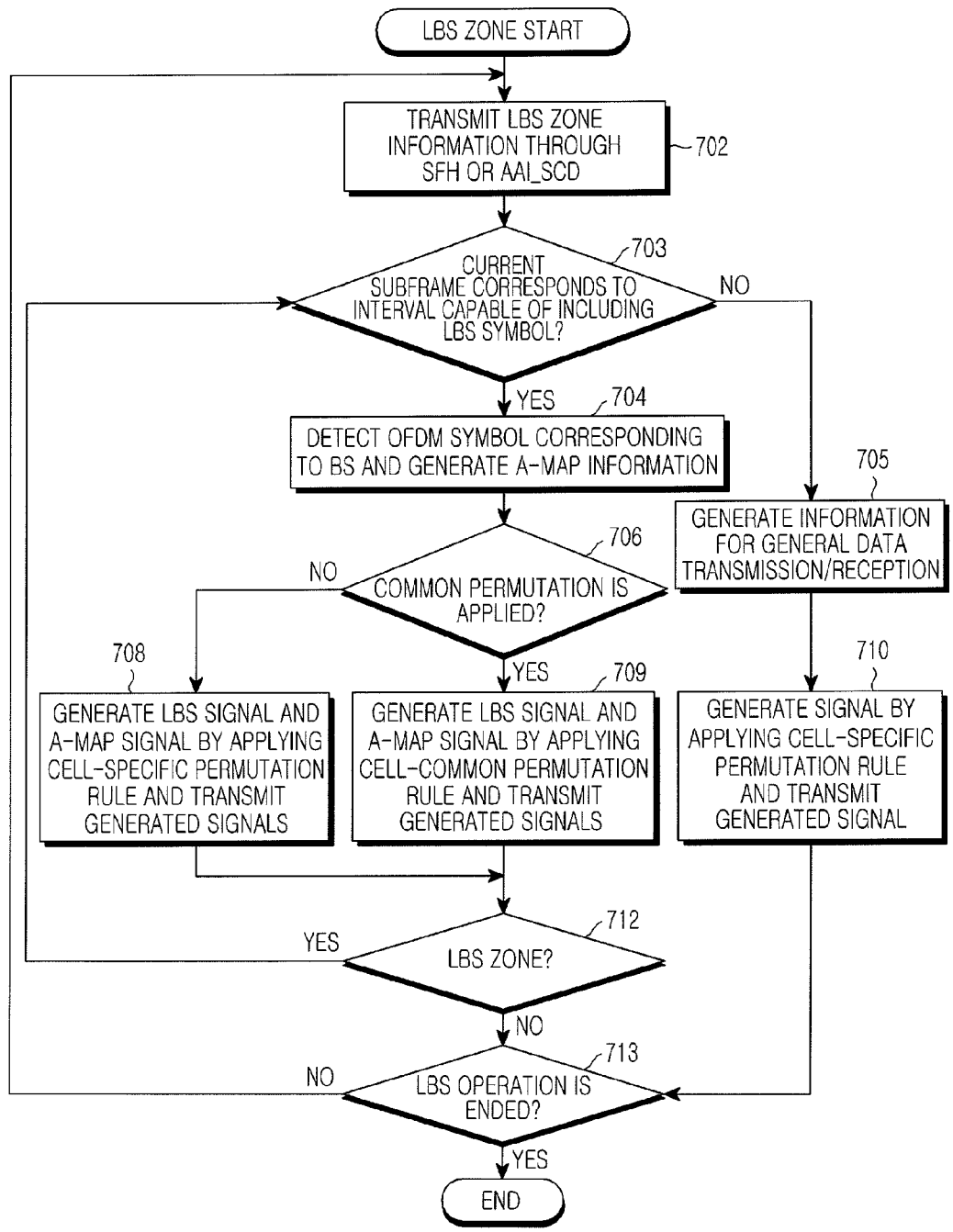
FIG. 7 is a flowchart illustrating an LBS operation of a BS in accordance with another exemplary embodiment of the present invention.

FIG. 7 is a flowchart illustrating an LBS operation of a BS according to an exemplary embodiment of the present invention.

Referring to FIG. 7, when one duration for the LBS operation is started, the BS broadcasts information related to an LBS zone to all MSs through SFH or AAI_SCD in step 702. Here, in order to start to apply an LBS zone, an LBS zone bit of the LBS-related information is set to a value indicating that the LBS zone has been set. In step 703, with reference to the LBS-related information, the BS determines if a subframe of the LBS zone is reached, that is, if a current subframe can include an LBS symbol. When the BS determines in step 703 that a current subframe cannot include an LBS symbol, the BS proceeds to step 705 and generates data so as to perform a data transmission/reception operation. The BS proceeds to step 710 and transmits the generated data by using a cell-specific permutation rule.

On the other hand, when the BS determines in step 703 that a current subframe can include an LBS symbol, the BS proceeds to step 704 and detects an OFDMA symbol that is in connection with the BS among OFDM symbols belonging to the LBS zone, and generates an A-MAP message including A-MAP information when the A-MAP information is to be transmitted in the current subframe, in order to transmit its reference signal through a corresponding LBS symbol. As an example, in order to identify the position of an OFDM symbol allocated to transmit its reference signal, among the OFDM symbols, the BS may check if the index of each OFDM symbol is in connection with its BS ID.

In step 706, with reference to "Common_perm_base_flag" of the LBS-related information, the BS determines if a common permutation rule is to be applied. When the BS determines in step 706 that a common permutation rule is not applied, the BS proceeds to step 708 and permutes resource units of the LBS zone by applying a cell-specific permutation rule, maps its reference signal for LBS and the A-MAP message to the permuted resource units, and transmits the reference signal and A-MAP message mapped to the permuted resource units. On the other hand, when the BS determines in step 706 that a common permutation rule is applied, the BS proceeds to step 709 and permutes resource units by applying a permutation equation into which a permutation base indicated by "Common_perm_base" is input, maps its reference signal for LBS and the A-MAP message to the permuted resource units, and transmits the reference signal and A-MAP message mapped to the permuted resource units.

Subsequently, the BS determines in step 712 if the LBS zone is ended. If the BS determines in step 712 that the LBS zone is not ended, and the BS returns to step 703. On the other hand, when the BS determines in step 712 that LBS zone is ended, the BS determines in step 713 if it continues to perform the LBS operation. If the BS determines in step 713 that it continues to perform the LBS operation, the BS returns to step 702. On the other hand, when the BS determines in step 713 that the LBS operation does not need to be performed any longer, the BS terminates the LBS-related operation.

Figure 8:
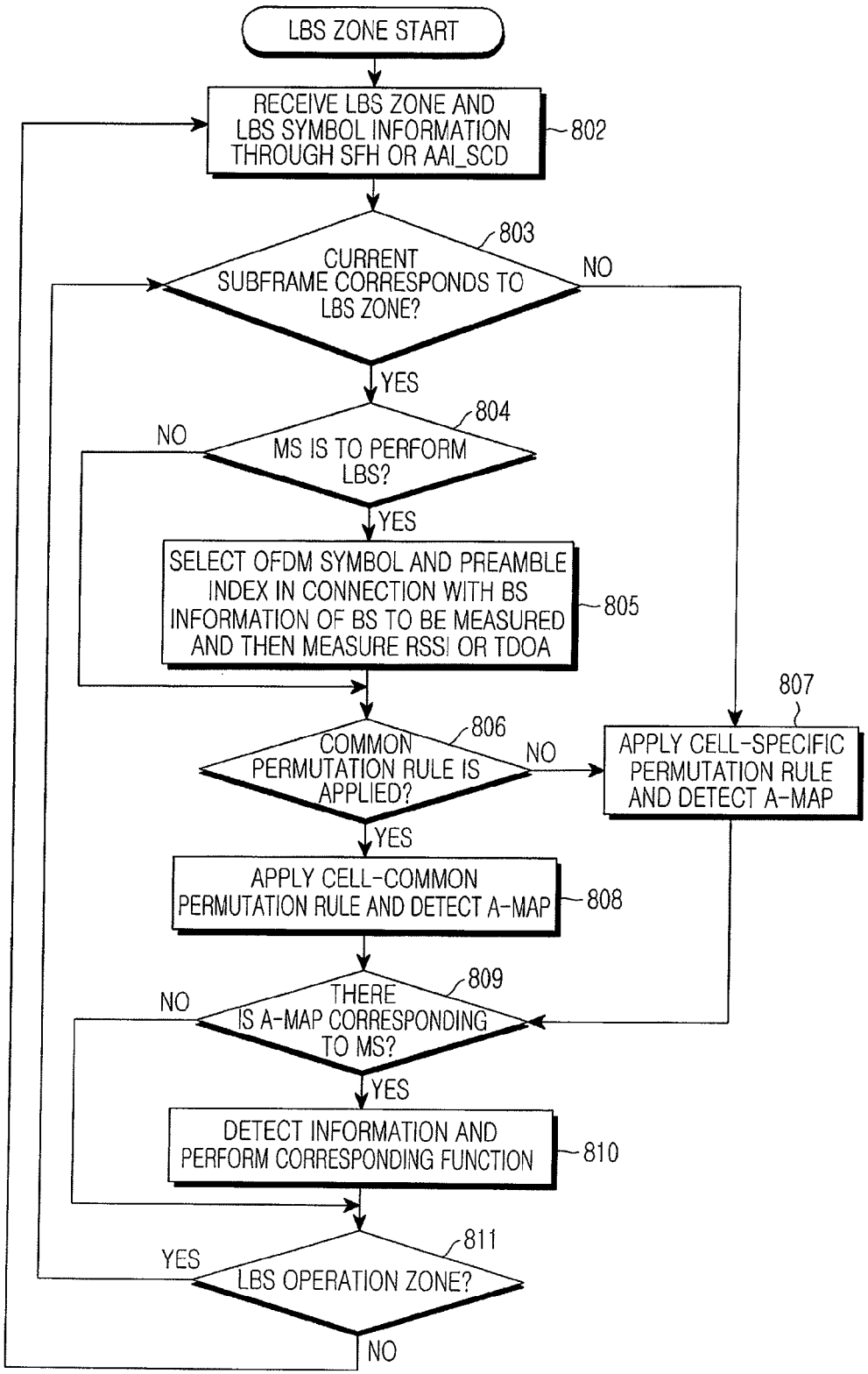
FIG. 8 is a flowchart illustrating an LBS operation of an MS in accordance with an exemplary embodiment of the present invention.

FIG. 8 is a flowchart illustrating an LBS operation of an MS according to an exemplary embodiment of the present invention.

Referring to FIG. 8, in step 802, the MS receives SFH or AAI_SCD including information related to an LBS zone from a BS, and confirms an LBS zone bit of the LBS-related information, which indicates that an LBS zone has been set. In step 803, based on the LBS-related information, the MS determines if a subframe of the LBS zone is reached, that is, if a current subframe can include an LBS symbol. When the MS determines in step 803 that a current subframe cannot include an LBS symbol, the MS proceeds to step 807 and receives A-MAP information from the BS by applying a cell-specific permutation rule.

On the other hand, when the MS determines in step 803 that a current subframe can include an LBS symbol, the MS determines in step 804 if the LBS operation needs to be performed, according to internal hardware settings, the BS's instructions, or the request of a user. When the MS determines in step 804 that the LBS operation needs to be performed, the MS proceeds to step 805. Otherwise, the MS proceeds to step 806.

In step 805, the MS selects OFDM symbols and a preamble index that are in connection with BSs to be measured, and measures values necessary for LBS, such as RSSI or TDOA, by receiving a reference signal of the LBS zone. As an example, in order to identify the position of an OFDM symbol allocated to a BS to be measured, among the OFDM symbols, the MS may determine if the index of each OFDM symbol is in connection with the BS ID of the BS to be measured. The measured values are used for estimate the location of the MS or are reported to the BS or a location server through an LBS_RSP message or an SCN_REP message.

In step 806, with reference to "Common_perm_base_flag", the MS determines if neighbor BSs apply a common permutation rule. When the MS determines in step 806 that neighbor BSs do not apply a common permutation rule, the MS proceeds to step 807 in order to apply a cell-specific permutation rule. On the other hand, when the MS determines in step 806 that neighbor BSs apply a common permutation rule, the MS receives an A-MAP message by applying a permutation equation into which a permutation base indicated by "Common_perm_base" of the LBS-related information is input in step 808, and determines in step 809 if the A-MAP message is applied to the MS. When the MS determines in step 809 that the A-MAP message is applied to the MS, the MS proceeds to step 810 and detects DL control information from the A-MAP message to perform a corresponding function. On the other hand, when the MS determines in step 809 that the A-MAP message is not applied to the MS, the MS proceeds to step 811.

In step 811, the MS determines if the LBS zone is ended, that is, if it is time for the BS to transmit new SFH or AAI_SCD. When the MS determines in step 811 that it is not time for the BS to transmit new SFH or AAI_SCD, the MS returns to step 803 because the LBS zone is maintained and thus the LBS-related information received in step 802 is still effective. On the other hand, when the MS determines in step 811 that the LBS zone is ended, that is, when it is time for the BS to transmit new SFH or AAI_SCD, the MS returns to step 802 in order to receive SFH or AAI_SCD including new LBS-related information. As another example, the MS decodes SFH or AAI_SCD to thereby determine if SFH or AAI_SCD includes LBS-related information, and then proceeds to step 803 when SFH or AAI_SCD includes LBS-related information.

From the viewpoint of a DL control channel, the scheme using an LBS zone (DL control transmission scheme), described with reference to FIG. 6, provides the effect of reducing the amount of interference signals in comparison to a typical situation. This is because, when the LBS zone is used, the number of BSs transmitting a reference signal in each symbol interval of the LBS zone is considerably less than in a typical environment.

Figure 9:
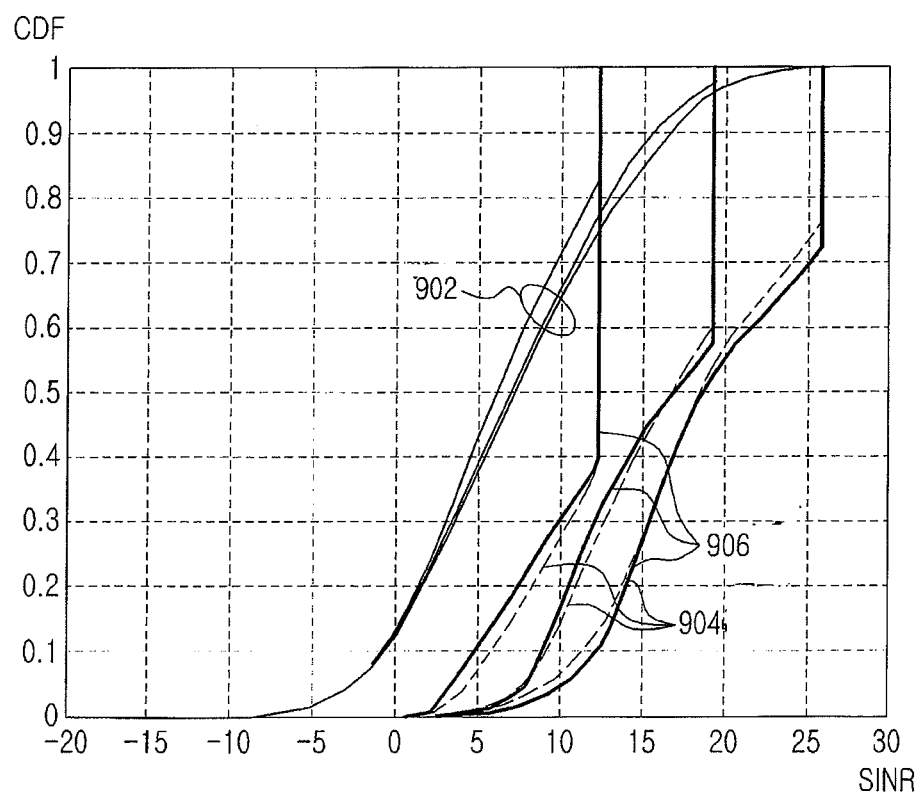
FIG. 9 graphically illustrates transmission performances of A-MAP messages transmitted using a superframe structure having an LBS zone in accordance with an exemplary embodiment of the present invention.

FIG. 9 graphically illustrates transmission performances of A-MAP messages transmitted using a superframe structure having an LBS zone according to an exemplary embodiment of the present invention. More specially, a Cumulative Density Function (CDF) for post processing SNR of each A-MAP message is plotted in the graph.

Referring to FIG. 9, the three first lines 902 represent SINR for an A-MAP message in a typical superframe environment where a superframe structure having an LBS zone is not used, the three second lines 906 and the three third lines 904 represent SINR for an A-MAP message in a superframe structure having an LBS zone. The second lines 906 and the third lines 904 correspond to results obtained by applying different rules, according to which MS selects a BS transmitting a reference signal in an LBS zone, respectively.

A received Bit Mutual Information Rate (RBIR) scheme is used for calculation of post processing SINR. Since the RBIR scheme outputs different result values according to modulation schemes, that is, Quadrature Phase Shift Keying (QPSK), 16 Quadrature Amplitude Modulation (16QAM), and 64 Quadrature Amplitude Modulation (64QAM), three resultant lines are plotted for each case.

When comparing the leftmost lines for the respective cases in consideration of the fact that an A-MAP message is transmitted in the QPSK scheme, it can be noted that the second and third lines 906, 904 using an LBS zone have higher SINR by about 5 dB to 7.5 dB than the first line 902. In view of the fact that a DL channel is designed on the basis on a typical situation, this means that excess transmit power can be reduced a DL control channel when an LBS zone is used. That is, since channel conditions become better, desired transmission performance can be maintained even though the transmit power of a DL control channel is relatively lowered.

As for an LBS reference signal, this also means that interference by a DL control channel is reduced. Thus, when the LBS_zone shown in FIG. 6 is used, there is an advantage in that not only LBS performance can be improved, but the LBS performance can also be further improved because excess power in a DL control channel can be used in transmitting an LBS reference signal. Therefore, the above exemplary embodiments of the present invention make it possible to expect improvements in the performances of a DL control channel and LBS through transmit power control between the DL control channel and LBS reference signals within the overall given transmit power.

According to an exemplary embodiment of the present invention, there may be provided a structure in which reference signals for LBS are dispersedly arranged in a predetermined number (T) of superframes. In such a case, one reference signal for LBS is arranged in each superframe, and a total of T reference signals for LBS are allocated to T consecutive superframes. A packet of these T superframes may periodically or non-periodically exist.

Figure 10A:
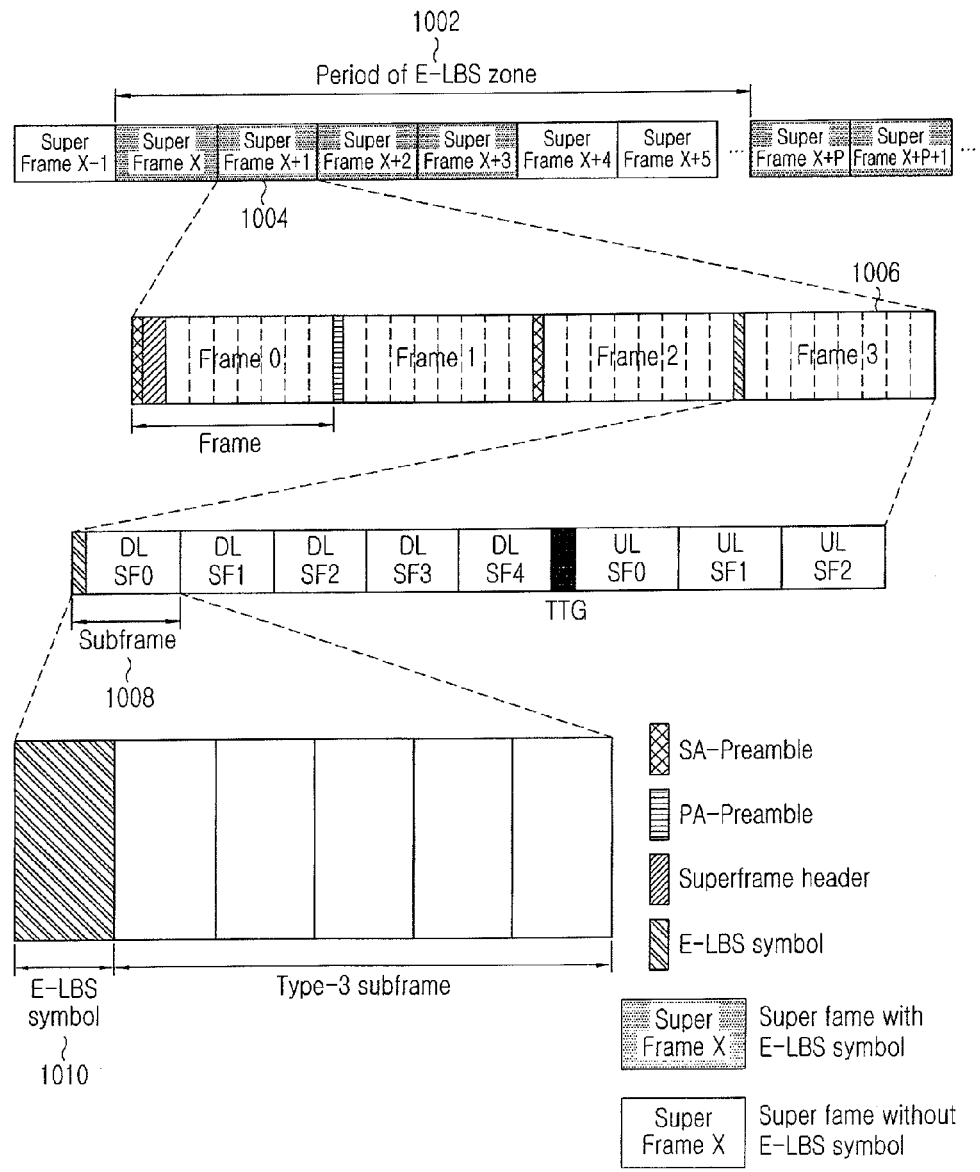
FIGS. 10A and 10B are views each illustrating a superframe structure for an LBS operation in accordance with an exemplary embodiment of the present invention.
Figure 10B:
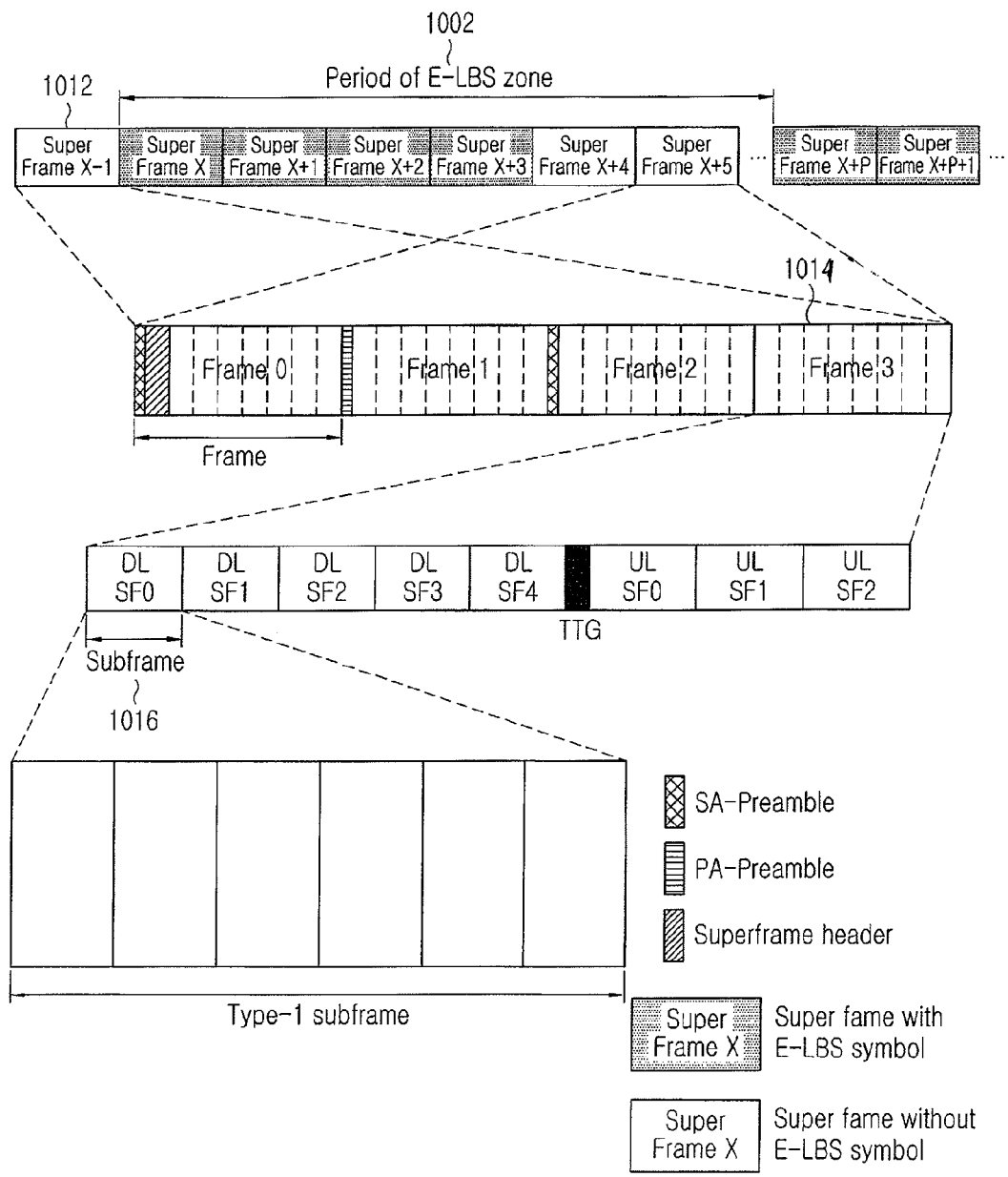

FIGS. 10A and 10B are views each illustrating a superframe structure for an LBS operation according to an exemplary embodiment of the present invention. Although, by way of example, reference is made to the TDD frame structure shown in FIG. 1, it is obvious that various frame structures may be employed according to used bands, CP lengths, DL:UL ratios, duplex modes, and the like.

Referring to FIGS. 10A and 10B, the second frame within each superframe 1004, 1012 carries a PA preamble, and the first and third frames carry an SA preamble. In contrast to FIGS. 2 and 6, an SA preamble is not positioned in the last frame. Additionally, the first frame may be specified to carry an SFH including system information and the like.

A predetermined number (T) of consecutive superframes 1004 (for example, superframes X, X+1, X+2, X+3) among P superframes constituting one period 1002 for an LBS operation are set as an LBS zone, and an OFDM symbol at a predetermined position in a predetermined frame 1006 within the superframes 1004 is used as an LBS symbol 1010 for carrying a reference signal for LBS. As an example, the first OFDM symbol positioned in the first subframe 1008 of the last frame 1006 is allocated to the LBS zone, and is used as the LBS symbol 1010. A reference signal (or beacon signal) is transmitted through the LBS symbol belonging to the LBS zone. The position of an OFDM symbol used as the LBS symbol may be determined, for example, according to a BS ID.

The first symbol of each frame within the superframes to which the LBS zone is allocated is represented by the pattern of synchronization signals. More specially, an SA preamble is transmitted in the first and third frames, a PA preamble is transmitted in the second frame, and a reference signal (or a beacon signal) for LBS is transmitted in the last frame. Compared with the frame structures in FIGS. 2 and 6, it can be noted that an SA preamble is not transmitted in the last frame.

Five OFDM symbols other than the OFDM symbol 1010 available to transmit a reference signal for LBS constitute a type 3 subframe, and are used for data transmission/reception. Among the T superframes, the position of an OFDM symbol to be used by a specific BS is determined according to a specific prearranged pattern. Each BS transmits a reference signal for LBS only in the determined OFDM symbol position, and does not transmit any signal through the other OFDM symbols.

When the T superframes are bundled into one packet, the number of symbols capable of transmitting a reference signal for LBS is T, and one or more symbols selected from among the T symbols according to a BS ID may be used to transmit a reference signal for LBS. In a variant exemplary embodiment of the present invention, the types of a reference signal for LBS to be transmitted through the selected symbol may also be selected according to the BS ID of a BS transmitting the corresponding reference signal. The BS transmits the reference signal only through the selected symbol, and does not transmit any signal through non-selected symbols among the T symbols. Within each subframe, symbols other than a symbol capable of transmitting a reference signal for LBS can be used for data transmission/reception.

Parameters relevant to transmission of an LBS zone are periodically provided through SFH or a MAC control message, as mentioned above. As an example, these parameters include information on the SuperFrame Number (SFN) of the first superframe from which the LBS zone is started or information on the period of an LBS zone.

The above-mentioned pattern of synchronization signals is also applied to superframes that are not assigned for an LBS zone. That is, an SA preamble or a reference signal does not exist in the last frame, and all OFDMA symbols can be used as data symbols.

FIG. 10B shows the structure of a superframe 1012 that does not belong to an LBS zone or a superframe that is assigned for the LBS zone, but in which a reference signal for LBS does not exist. Each of first three frames within the superframe 1012 uses the first OFDM symbol as a preamble. Dissimilar to the frame 1006 in the LBS zone, the first OFDM symbol of the last frame 1014 is used for typical data transmission/reception. Thus, dissimilar to the first three frames, data transmission/reception is performed according to the type 1 subframe structure 1016 in the frame 1014.

Figure 11:
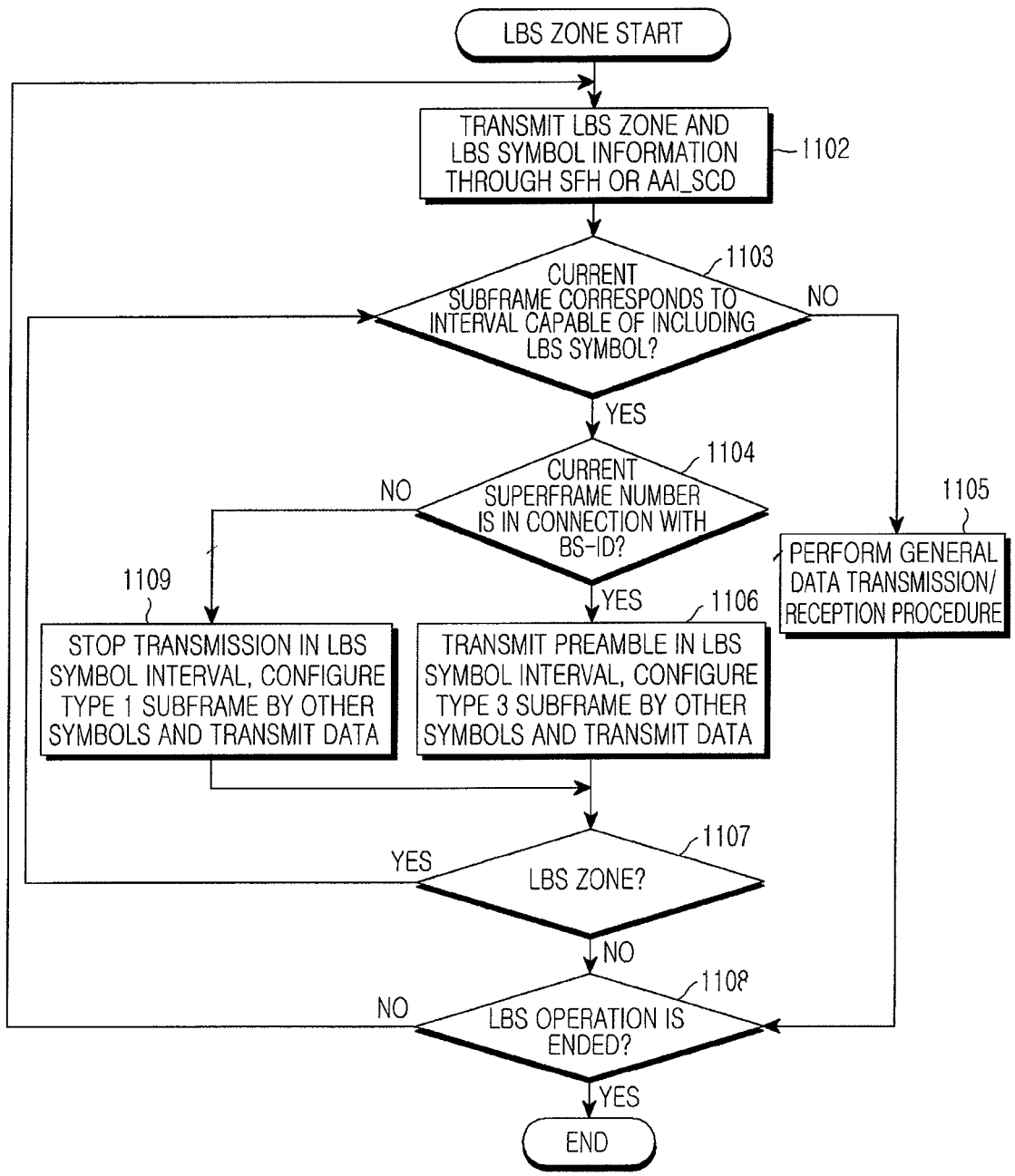
FIG. 11 is a flowchart illustrating an LBS operation of a BS in accordance with an exemplary embodiment of the present invention.

FIG. 11 is a flowchart illustrating an LBS operation of a BS according to an exemplary embodiment of the present invention.

Referring to FIG. 11, when one period for an LBS operation is started, the BS broadcasts LBS-related information, for example, at least one of an LBS zone bit, LBS subframe information, and LBS symbol information, to all MSs through SFH or AAI_SCD in step 1102. Here, in order to start to apply an LBS zone, the LBS_zone bit is set to a value indicating that the LBS zone has been set. In step 1103, based on the LBS subframe information, the BS determines if a subframe capable of including an LBS symbol is reached, that is, if a current subframe can include an LBS symbol. When the BS determines in step 1103 that a current subframe cannot include an LBS symbol, the BS proceeds to step 1105 and performs a data transmission/reception operation in the conventional manner by using all symbols of the corresponding subframe, that is, by using the type 1 subframe structure.

On the other hand, when the BS determines in step 1103 that a current subframe can include an LBS symbol, the BS determines in step 1104 if the SFN of the current superframe is in connection with its BS ID, in order to determine whether to transmit its reference signal through the LBS symbol of the current subframe. As an example, when the remainder of division of its BS ID by the SFN of the current superframe equals a predetermined value, the BS determines that the SFN of the current superframe is in connection with its BS ID. The predetermined value is uniquely or non-overlappingly allocated in advance to each BS within the limits of the possible.

When the BS determines in step 1104 that the SFN of the current superframe is in connection with its BS, t BS proceeds to step 1106 and transmits an SA preamble or a reference signal for LBS in an OFDMA symbol interval of the current subframe, which is assigned for an LBS symbol. Here, the position of an LBS symbol is indicated by the LBS symbol information. At the same time, the other symbols of the current subframe, excluding the LBS symbol, can be used for data transmission/reception when data is to be transmitted/received. On the other hand, when the BS determines in step 1104 that the SFN of the current superframe is not in connection with its BS ID, the BS proceeds to step 1109 and waits without transmitting a reference signal in an OFDMA symbol interval assigned for an LBS symbol, but performs data transmission/reception through the other symbols when data is to be transmitted/received.

Subsequently, the BS determines in step 1107 if the LBS zone is ended. If the BS determines in step 1107 that the LBS zone is not ended, the BS returns to step 1103. On the other hand, when the BS determines in step 1107 that the LBS_zone is ended, the BS determines in step 1108 if it continues to perform the LBS operation. If the BS determines in step 1108 that it continues to perform the LBS operation, the BS returns to step 1102. On the other hand, when the BS determines in step 1108 that the LBS operation does not need to be performed any longer, the BS terminates the LBS-related operation, and performs a data transmission/reception operation by using all the symbols.

Figure 12:
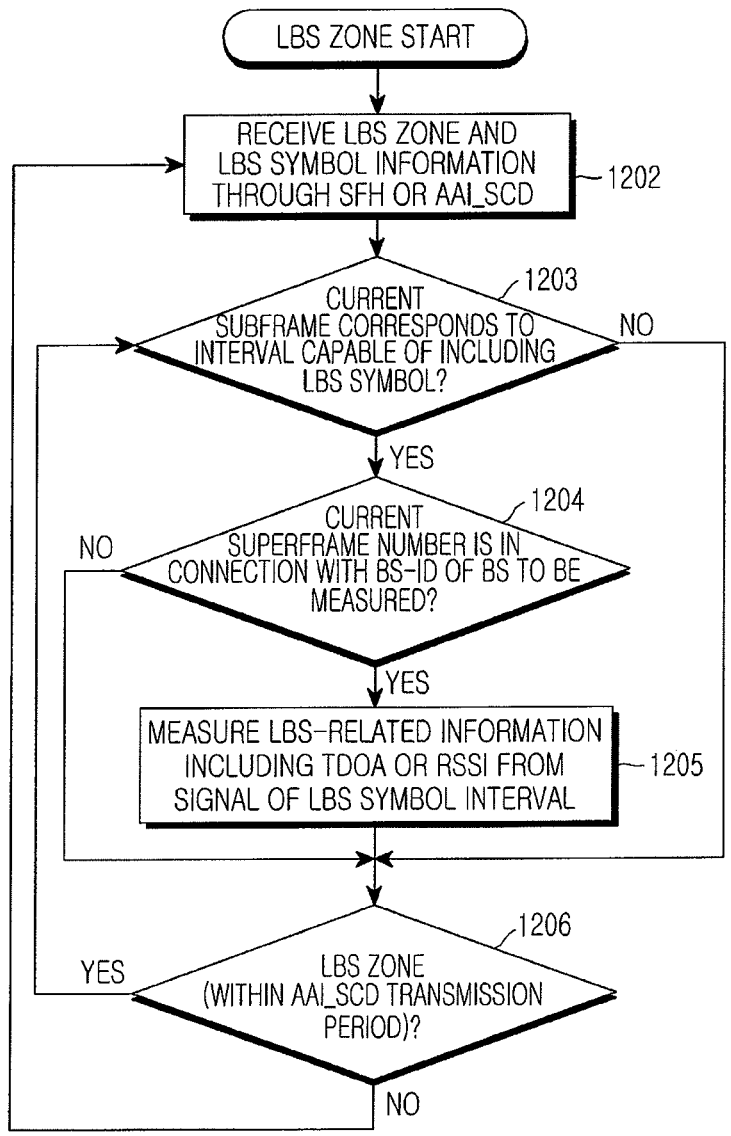
FIG. 12 is a flowchart illustrating an LBS operation of an MS in accordance with an exemplary embodiment of the present invention.

FIG. 12 is a flowchart illustrating an LBS operation of an MS according to an exemplary embodiment of the present invention.

Referring to FIG. 12, in step 1202, the MS receives SFH or AAI_SCD including LBS-related information, for example, at least one of an LBS zone bit, LBS subframe information, and LBS symbol information, from a BS, and confirms the LBS zone bit indicating that an LBS zone has been set. In step 1203, based on the LBS subframe information, the MS determines if a subframe capable of including an LBS symbol is reached, that is, if a current subframe can include an LBS symbol. When it is determined in step 1203 that a current subframe cannot include an LBS symbol, the MS proceeds to step 1206.

On the other hand, when it is determined in step 1203 that a current subframe can include an LBS symbol, the MS determines in step 1204 if the SFN of the current superframe is in connection with the BS ID of a corresponding BS to be measured. As an example, when the remainder of division of a BS ID by the SFN of the current superframe equals a predetermined value allocated to a corresponding BS, the MS determines that the SFN of the current superframe is in connection with the BS ID of the corresponding BS. Here, the MS acquires and stores in advance information on neighbor BSs to be measured, that is, their BS IDs, values allocated to the BSs, and the like, through a neighbor advertisement (NBR_ADV) message or an LBS advertisement (LBS_ADV) message broadcasted from a serving BS.

When it is determined in step 1204 that the SFN of the current superframe is in connection with the BS to be measured, the MS proceeds to step 1205 and receives an SA preamble or a reference signal for LBS in an OFDMA symbol interval assigned for an LBS symbol, and measures values necessary for LBS, such as TDOA or RSSI. The measured values are used for the MS to estimate its own location or are reported to the BS or a location server through an LBS ReSPonse (LBS_RSP) message or a SCN_REP message. On the other hand, when it is determined in step 1204 that the SFN of the current superframe is not in connection with the BS ID of the BS to be measured, the MS proceeds to step 1206 without measuring the values.

In step 1206, the MS determines if the LBS zone is ended, that is, if it is time for the BS to transmit new SFH or AAI_SCD. When it is determined in step 1206 that it is not time for the BS to transmit new SFH or AAI_SCD, the MS returns to step 1203 because the LBS zone is maintained and thus the LBS-related information received in step 1202 is still effective. On the other hand, when it is determined in step 1206 that the LBS zone is ended, that is, when it is time for the BS to transmit new SFH or AAI_SCD, the MS returns to step 1202 in order to receive SFH or AAI_SCD including new LBS-related information. As another example, the MS decodes SFH or AAI_SCD to thereby determine if SFH or AAI_SCD includes LBS-related information, and then proceeds to step 1203 when SFH or AAI_SCD includes LBS-related information.

Figure 13:
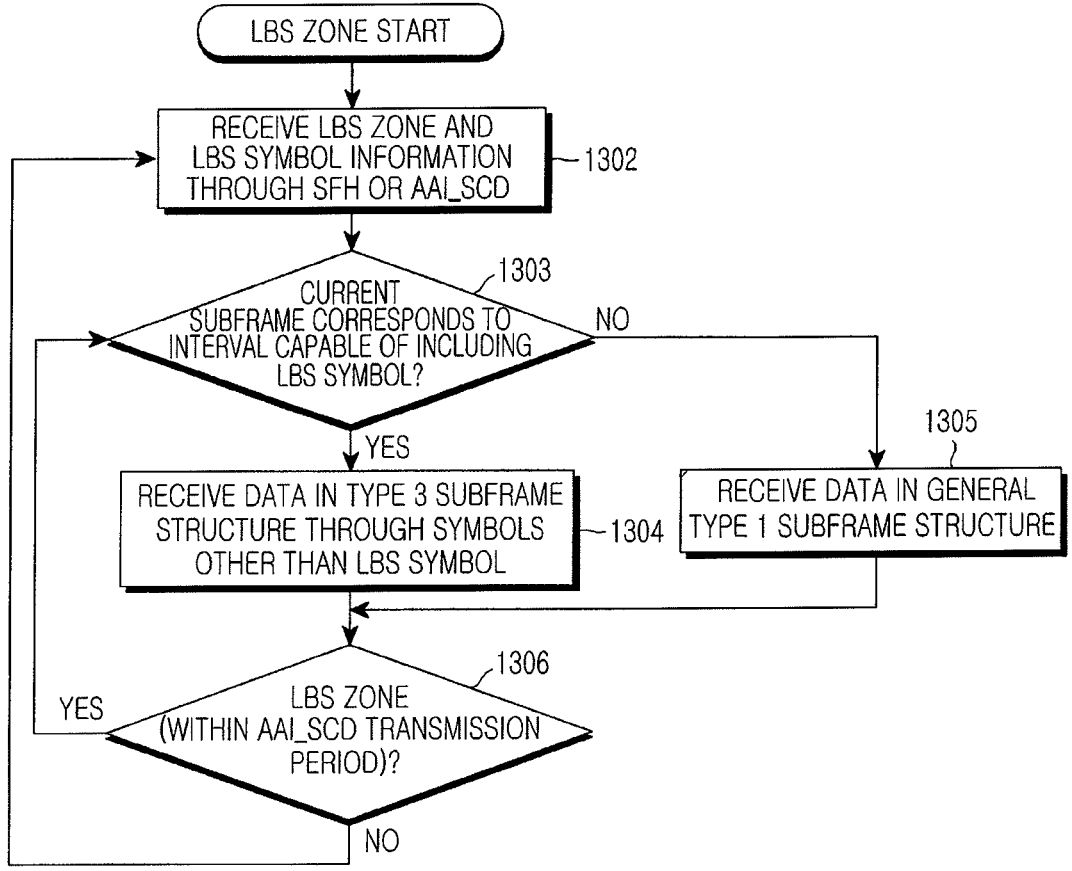
FIG. 13 is a flowchart illustrating another LBS operation of an MS in accordance with an exemplary embodiment of the present invention.

FIG. 13 is a flowchart illustrating a data transmission/reception operation of an MS according to an exemplary embodiment of the present invention.

Referring to FIG. 13, in step 1302, the MS receives SFH or AAI_SCD including LBS-related information, for example, at least one of an LBS zone bit, LBS subframe information, and LBS symbol information, from a BS, and confirms the LBS zone bit indicating that an LBS zone has been set. In step 1303, based on the LBS subframe information, the MS determines if a subframe capable of including an LBS symbol is reached, that is, if a current subframe can include an LBS symbol. When it is determined in step 1303 that a current subframe can include an LBS symbol, the MS proceeds to step 1304 and transmits/receives data through the other symbols of the current subframe, which are not assigned for an LBS symbol indicated by the LBS symbol information. Here, the type 3 subframe structure is used. On the other hand, when it is determined in step 1303 that the current subframe cannot include an LBS symbol, the MS proceeds to step 1305 and performs typical data transmission/reception by means of all the symbols of the current subframe. Here, the type 1 subframe structure is used.

In step 1306, the MS determines if the LBS zone is ended, that is, if a new transmission period of SFH or AAI_SCD is reached. When it is determined in step 1306 that a new transmission period of SFH or AAI_SCD is not reached, the MS returns to step 1303 because the LBS-related information received in step 1302 is still effective. On the other hand, when it is determined in step 1306 that a new transmission period of SFH or AAI_SCD is reached, the MS returns to step 1302 in order to receive SFH or AAI_SCD including new LBS-related information. As another example, the MS decodes SFH or AAI_SCD to thereby check if SFH or AAI_SCD includes LBS-related information, and then proceeds to step 1303 when SFH or AAI_SCD includes LBS-related information.

The operations according to exemplary embodiments of the present invention as described above may be implemented by providing a BS and an MS with a memory device storing corresponding program codes respectively. That is, a BS and an MS perform the above operations by reading out and executing program codes, stored in a memory device, by a processor or a Central Processing Unit (CPU), and exchanging necessary information with each other.

As a concrete example, a BS includes a controller (may be formed by a processor or a CPU) for generating SFH or AAI_SCD, which includes LBS-related information, and checking an LBS symbol interval, and a transceiver for performing operations of transmitting SFH or AAI_SCD and transmitting a reference signal or waiting without transmitting any signal in a fixed LBS symbol interval, under the control of the controller. Similarly, an MS includes a controller (may be formed by a processor or a CPU) for parsing SFH or AAI_SCD, which includes LBS-related information, and checking an LBS symbol interval, and a transceiver for performing operations of receiving SFH or AAI_SCD and receiving a reference signal in a fixed LBS symbol interval, under the control of the controller.

As described above, exemplary embodiments of the present invention provide the effect of improving the reception performance of a neighbor BS signal and thus improving the accuracy of DL-based wireless positioning by using LBS symbols periodically allocated within an LBS zone. Further, exemplary embodiments of the present invention make it possible to estimate the location of an MS while minimizing the influence on data communication between a BS and the MS by limiting LBS symbols for use in wireless positioning to one or two per frame and maintaining data communication through the other symbols of a corresponding frame.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting a reference signal from a Base Station (BS) to a Mobile Station (MS) for positioning in a wireless communication system, the method comprising:
   locating a Primary Advance (PA) preamble in a first symbol of a second frame among frames constituting each of multiple superframes;
   locating a Secondary Advance (SA) preamble in first symbols of first and third frames among the frames constituting each of the multiple superframes;
   determining a plurality of consecutive first superframes belonging to a Location-Based Service (LBS) zone from among the multiple superframes;
   including the reference signal for LBS in a first symbol of a first subframe of a last frame among frames constituting each of the first superframes;
   when data is to be transmitted, including the data in a first symbol of a first subframe of a last frame among frames constituting each of second superframes that correspond to the multiple superframes excluding the first superframes; and
   communicating with the MS by using the first and second superframes.

2. The method as claimed in claim 1, further comprising:
   transmitting the reference signal in a frame with a superframe number that, according to a predetermined rule, has relevance to a Base Station IDentifier (BS-ID) of a Base Station (BS) transmitting the reference signal; and
   waiting without transmitting the reference signal in a frame with the superframe number that has no relevance to the BS-ID.

3. The method as claimed in claim 1, wherein the reference signal is used for the MS to estimate a location thereof, or is reported to a BS or a location server through a message predetermined by the MS.

4. The method as claimed in claim 1, further comprising:
   transmitting a control message including information indicating whether LBS zone transmission is switched on.

5. The method as claimed in claim 4, wherein the information indicating whether the LBS zone transmission is switched on includes a period of the LBS zone.

6. The method as claimed in claim 5, wherein the control message comprises a SuperFrame Header (SFH) that is transmitted through a first frame within each superframe.

7. The method as claimed in claim 1, wherein the PA preamble and the SA preamble are a series of predefined symbols for use in synchronization and equalization, and wherein the PA preamble provides basic BS information, and the SA preamble provides additional BS information.

8. A method of receiving a reference signal from a Base Station (BS) to a Mobile Station (MS) for positioning in a wireless communication system, the method comprising:
   detecting a Primary Advanced (PA) preamble from a first symbol of a second frame among frames constituting each of multiple superframes;
   detecting a Secondary Advance (SA) preamble from first symbols of first and third frames among the frames constituting each of the multiple superframes;

when a Location-Based Service (LBS) zone is enabled, determining a plurality of consecutive first superframes belonging to the LBS zone from among the multiple superframes;

receiving and detecting the reference signal for LBS from a first symbol of a first subframe of a last frame among frames constituting each of the first superframes; and when data is to be received, detecting the data from a first symbol of a first subframe of a last frame among frames constituting each of second superframes that correspond to the multiple superframes excluding the first superframes.

9. The method as claimed in claim 8, further comprising: receiving the reference signal in a frame with a superframe number having predetermined relevance to a Base Station IDentifier (BS-ID) of a Base Station (BS) to be measured.

10. The method as claimed in claim 8, wherein the reference signal is used for the MS to estimate a location thereof, or is reported to a BS or a location server through a message predetermined by the MS.

11. The method as claimed in claim 8, further comprising: receiving a control message including information indicating whether LBS zone transmission is switched on.

12. The method as claimed in claim 11, wherein the information indicating whether the LBS zone transmission is switched on includes a period of the LBS zone.

13. The method as claimed in claim 12, wherein the control message comprises a SuperFrame Header (SFH) that is transmitted through a first frame within each superframe.

14. The method as claimed in claim 8, wherein the PA preamble and the SA preamble are a series of predefined symbols for use in synchronization and equalization, and wherein the PA preamble provides basic BS information, and the SA preamble provides additional BS information.

15. An apparatus of a Base Station (BS) for transmitting a reference signal for positioning in a wireless communication system, the apparatus comprising:

a controller for locating a Primary Advance (PA) preamble in a first symbol of a second frame among frames constituting each of multiple superframes, for locating a Secondary Advance (SA) preamble in first symbols of first and third frames among the frames constituting each of the multiple superframes, for determining a plurality of consecutive first superframes belonging to a Location-Based Service (LBS) zone from among the multiple superframes, for including a reference signal for LBS in a first symbol of a first subframe of a last frame among frames constituting each of the first superframes, and for including data in a first symbol of a first subframe of a last frame among frames constituting each of second superframes, which correspond to the multiple superframes excluding the first superframes, when the data is to be transmitted; and a transmitter for communicating with a Mobile Station (MS) by using the first and second superframes, under a control of the controller.

16. The apparatus as claimed in claim 15, wherein the controller transmits the reference signal in a frame with a superframe number that, according to a predetermined rule, has relevance to a Base Station IDentifier (BS-ID) of a Base Station (BS) transmitting the reference signal, and waits without transmitting the reference signal in a frame with the superframe number that has no relevance to the BS-ID.

17. The apparatus as claimed in claim 15, wherein the reference signal is used for a Mobile Station (MS) to estimate a location thereof, or is reported to a BS or a location server through a message predetermined by the MS.

18. The apparatus as claimed in claim 15, wherein the transmitter transmits a control message including information indicating whether LBS zone transmission is switched on.

19. The apparatus as claimed in claim 18, wherein the information indicating whether the LBS zone transmission is switched on includes a period of the LBS zone.

20. The apparatus as claimed in claim 19, wherein the control message comprises a SuperFrame Header (SFH) that is transmitted through a first frame within each superframe.

21. The apparatus as claimed in claim 15, wherein the PA preamble and the SA preamble are a series of predefined symbols for use in synchronization and equalization, and wherein the PA preamble provides basic BS information, and the SA preamble provides additional BS information.

22. An apparatus of a Mobile Station (MS) for receiving a reference signal for positioning in a wireless communication system, the apparatus comprising:

a receiver for receiving the reference signal; and a controller for detecting a Primary Advanced (PA) preamble from a first symbol of a second frame among frames constituting each of the multiple superframes, for detecting a Secondary Advance (SA) preamble from first symbols of first and third frames among the frames constituting each of the multiple superframes, for determining a plurality of consecutive first superframes belonging to a Location-Based Service (LBS) zone from among the multiple superframes when the LBS zone is enabled, for detecting the reference signal for LBS from a first symbol of a first subframe of a last frame among frames constituting each of the first superframes, and for detecting data from a first symbol of a first subframe of a last frame among frames constituting each of second superframes, which correspond to the multiple superframes excluding the first superframes, when the data is to be received.

23. The apparatus as claimed in claim 22, wherein the controller controls the receiver to receive the reference signal in a frame with a superframe number having predetermined relevance to a Base Station IDentifier (BS-ID) of a Base Station (BS) to be measured.

24. The apparatus as claimed in claim 22, wherein the reference signal is used for a MS to estimate a location thereof, or is reported to a Base Station (BS) or a location server through a message predetermined by the MS.

25. The apparatus as claimed in claim 22, wherein the receiver receives a control message including information indicating whether LBS zone transmission is switched on.

26. The apparatus as claimed in claim 25, wherein the information indicating whether the LBS zone transmission is switched on includes a period of the LBS zone.

27. The apparatus as claimed in claim 26, wherein the control message comprises a SuperFrame Header (SFH) that is transmitted through a first frame within each superframe.

28. The apparatus as claimed in claim 22, wherein the PA preamble and the SA preamble are a series of predefined symbols for use in synchronization and equalization, and wherein the PA preamble provides basic BS information, and the SA preamble provides additional BS information.

* * * * *